US009930621B2

(12) United States Patent
De Gaudenzi

(10) Patent No.: US 9,930,621 B2
(45) Date of Patent: Mar. 27, 2018

(54) TRANSMIT POWER CONTROL IN A SPREAD-SPECTRUM UNSLOTTED RANDOM ACCESS COMMUNICATION SYSTEM

(71) Applicant: Agence Spatiale Europeenne, Paris (FR)

(72) Inventor: Riccardo De Gaudenzi, The Hague (NL)

(73) Assignee: Agence Spatiale Europeenne, Paris (FR)

( * ) Notice: Subject to any disclaimer, the term of this patent is extended or adjusted under 35 U.S.C. 154(b) by 302 days.

(21) Appl. No.: 14/760,342

(22) PCT Filed: Jan. 3, 2014

(86) PCT No.: PCT/IB2014/058038
§ 371 (c)(1),
(2) Date: Jul. 10, 2015

(87) PCT Pub. No.: WO2014/108819
PCT Pub. Date: Jul. 17, 2014

(65) Prior Publication Data
US 2015/0351043 A1 Dec. 3, 2015

(30) Foreign Application Priority Data

Jan. 11, 2013 (WO) .................. PCT/IB2013/000547

(51) Int. Cl.
*H04W 52/24* (2009.01)
*H04W 52/10* (2009.01)
(Continued)

(52) U.S. Cl.
CPC .............. *H04W 52/10* (2013.01); *H04B 1/69* (2013.01); *H04B 7/216* (2013.01);
(Continued)

(58) Field of Classification Search
CPC . H04W 52/10; H04W 52/146; H04W 52/241; H04W 52/24; H04B 1/69
See application file for complete search history.

(56) References Cited

U.S. PATENT DOCUMENTS

| 2004/0100897 A1* | 5/2004 | Shattil ...................... H04L 1/04 370/206 |
| 2010/0054131 A1* | 3/2010 | del Rio Herrero ........................ H04B 1/71072 370/236 |
| 2011/0235599 A1* | 9/2011 | Nam ..................... H04L 1/0027 370/329 |

FOREIGN PATENT DOCUMENTS

| EP | 1 686 746 A1 | 8/2006 |
| EP | 2 159 926 A1 | 3/2010 |

OTHER PUBLICATIONS

International Search Report and Written Opinion from corresponding International Patent Application No. PCT/IB2014/058038 dated Feb. 27, 2014.

(Continued)

*Primary Examiner* — Wei Zhao
(74) *Attorney, Agent, or Firm* — Alston & Bird LLP

(57) ABSTRACT

A method of transmitting data packets from a terminal (T) to a gateway receiver (GWR) over a channel shared with other terminals using an unslotted spread spectrum random access protocol, characterized in that transmission is performed at a transmit power level given by the sum of a deterministic term, function of a communication link budget, and of a random term, following a predetermined probability distribution. A method of operating a communication system, based on the method of transmitting data packets. A communication system and a terminal for implementing the methods.

13 Claims, 20 Drawing Sheets

(51) Int. Cl.
    *H04B 1/69*     (2011.01)
    *H04W 74/08*    (2009.01)
    *H04W 72/04*    (2009.01)
    *H04B 7/216*    (2006.01)
    *H04W 52/14*    (2009.01)
    *H04W 52/26*    (2009.01)

(52) U.S. Cl.
    CPC ....... *H04W 52/146* (2013.01); *H04W 52/241* (2013.01); *H04W 52/265* (2013.01); *H04W 72/0473* (2013.01); *H04W 74/0833* (2013.01)

(56) References Cited

OTHER PUBLICATIONS

Foti G et al.; "*Spread-Spectrum Techniques for the Provision of Packet Access on the Reverse Link of Next-Generation Broadband Multimedia Satellite Systems*"; IEEE Journal on Selected Areas in Communications, IEEE Service Center; vol. 22, No. 3; Apr. 1, 2004; pp. 574-583; XP011110207.

Caire, G. et al.; "*Maximizing the Spectral Efficiency of Coded CDMA Under Successive Decoding*"; IEEE Trans. on Information Theory; Jan. 2004; pp. 152-164.

Caire, G. et al.; "*Iterative Multiuser Joint Decoding: Optimal Power Allocation and Low-Complexity Implementation*"; IEEE Trans. on Information Theory; Sep. 2004; pp. 1950-1973.

Del Rio Herrero O. et al.; "*High Efficiency Satellite Multiple Access Scheme for Machine-to-Machine Communications*"; IEEE Transactions on Aerospace and Electronic Systems; vol. 4, Issue 4; pp. 2961-2989; Oct. 2012.

Del Rio Herrero O. et al.; "*Spread-Spectrum Techniques for the Provision of Packet Access on the Reverse Link of Next-Generation Broadband Multimedia Satellite Systems*"; IEEE Journal on Sel. Areas in Comm.; vol. 22, No. 3; pp. 574-583; Apr. 2004.

Verdu S. et al.; "*Spectral Efficiency of CDMA with Random Spreading*"; IEEE Transact. on Information Theory; vol. 45; pp. 622-640; Mar. 1999.

Viterbi A.J. et al.; "*Very Low Rate Convolutional Codes for Maximum Theoretical Performance of Spread-Spectrum Multiple-Access Channels*"; IEEE Journal on Sel. Areas in Comm.; vol. 8; No. 4; May 1990; pp. 641-649.

\* cited by examiner

TRANSMIT POWER CONTROL IN A SPREAD-SPECTRUM UNSLOTTED RANDOM ACCESS COMMUNICATION SYSTEM

FIELD

The invention relates to a method of transmitting data packets from a terminal to a gateway receiver over a channel shared with other terminals using an unslotted spread spectrum random access protocol, characterized by a decentralized control of the transmit power allowing to optimize the channel throughput.

The invention also relates to a method of operating a communication system with spread-spectrum unslotted random access, to such a communication system and to a user terminal, all implementing said decentralized control of the transmit power.

The invention applies in particular, albeit not exclusively, to the implementation of the return link of a satellite broadcast system, wherein a large number of user terminals transmit data packets to a gateway over a satellite channel with a very low duty cycle. In a system according to the invention, the gateway receiver performs packet detection using conventional or iterative successive interference cancellation.

The invention has potential applications both for mobile satellite communications at L/S band and for fixed satellite applications, in which the return link usually operates at Ka/Ku/C-band.
Among the mobile applications it is possible to cite:
Data services
　Mobile broadband—anywhere, anytime (vehicles, trains, planes)
　Public safety & first-responder services
　Issue distress beacons in the event of an accident
　Emergency alerting
　Monitoring of traffic flows
Environmental monitoring
　Combination with GNSS applications (GPS, Galileo, etc)
　Location-aware services
　Vehicle Information
　Deliver real time information on the road traffic
　Automatic paying of highway or city toll
And among the fixed applications:
Connected TV: as return link for interactive STB/TV (Set-top Box TeleVision), coupled with a forward link in Ku-band, for services such as:
　i. Voting
　ii. Payment transactions
　iii. Personal & domotic services
　iv. Limited web browsing
M2M: as return link for M2M/IoT (Machine-to-Machine/Internet of Things) applications such as:
　i. Data acquisition
　ii. Alarm triggering
The invention has also applications in wireless terrestrial systems, e.g. in the 3GPP and 3GPP2 standards or their evolutions.

BACKGROUND

All or most of these applications concern non-real-time messaging (data collection or short text messaging), wherein a great number of user terminals transmits short messages with a very low duty-cycle. Typically, individual messages have a length of a few tens to a few hundreds of bytes, and a low bit rate (e.g. a few kbps to a few tens of kbps). The delivery delay should be from a few seconds to a few minutes (even more if the terminal is not in visibility of the satellite). The typical activity factor is estimated in a few tens of Kbytes per user per day (e.g. 100 messages of 100 bytes=10 KB), i.e. a very low one.

Such a low duty-cycle traffic makes efficient implementation of the return link (or uplink) challenging, because:
　Classical Demand Assignment Multiple Access—DAMA or Contention Free DAMA do not work properly with this type of traffic characterized by large number of users with unpredictable low duty-cycle traffic patterns;
　closed loops for timing synchronization as required for slotted random access systems such as Slotted-Aloha or the more recently proposed Contention Resolution Diversity Slotted Aloha (CRDSA)—see document EP 1 686 746 would require an unacceptable signalling overhead,
　power control as required for spread Aloha random access system would require an unacceptable signalling overhead.

The Spread-Spectrum Aloha (also known as "Spread Aloha") protocol—SSA—described in the paper by O. del Rio Herrero et al. "Spread-spectrum techniques for the provision of packet access on the reverse link of next-generation broadband multimedia satellite systems", IEEE Journal on Sel. Areas in Comm., vol. 22, no. 3, pp. 574-583, April 2004, shows potentially interesting features. It provides a higher throughput capability than CRDSA for the same Packet Loss Ratio target under equal power multiple access conditions and using powerful physical layer FEC (Forward Error Correction), i.e. of the order of G=0.45 b/s/Hz for a packet loss ratio of $10^{-3}$. Furthermore SSA allows operating in a truly asynchronous mode, i.e. without the need of synchronizing the terminals to ensure "slotted" operation. The basic principle of the Spread-Aloha scheme is the following: when a user terminal has a packet to transmit, it picks up at random one spreading sequence among a predetermined set of sequences, and one possible spreading code phase, and transmits it (a single spreading sequence may be sufficient in some applications). If two messages, transmitted using a same spreading sequence and spreading code phase, collide and are lost, transmission is tried again after a random delay. One of the major weakness of SSA is its fragility to packet power unbalance conditions which is heavily curtailing its performance. In a random access satellite network it is very difficult to achieve tight power control thus SSA practically achievable efficiency is very modest.

Document EP 2 159 926 describes an improvement of SSA (called E-SSA, for Enhanced Spread Spectrum Aloha), using Iterative Successive Interference Cancellation to recover corrupted packets, thus increasing the throughput of the channel in particular when received packet power unbalance occurs. Contrarily to SSA, the E-SSA detection process allows to achieve higher throughput in the presence of unbalanced packets power. Document EP 2 159 926 also discloses a basic decentralized transmission control algorithm (SDUPTC: SNIR-Driven Uplink Packet Transmission Control). Its principle is simple: user terminals only transmit when the downlink signal quality is good i.e. the signal strength or better signal-to-noise plus interference ratio (SNIR) is within a certain window representative of line of sight conditions (LOS). If this is not the case the transmission is delayed until LOS conditions are verified. A simple congestion control mechanism is also disclosed, reducing the transmission rate when the channel is congested.

SUMMARY

The invention aims at improving the E-SSA—and more general any other communication protocol using unslotted spread spectrum random access and, at the receiver, packet detection by "conventional" or iterative successive interference cancellation—by increasing the maximum achievable throughput.

According to the invention, this result is achieved by implementing a fully decentralized control of the transmit power of the terminals.

It is known in the art that the user terminal power distribution at the input of a Successive Interference Cancellation (SIC) decoder has a strong influence on the packet error ratio (PER). In particular, Viterbi (A. J. Viterbi, "Very Low Rate Convolutional Codes for Maximum Theoretical Performance of Spread-Spectrum Multiple-Access Channels", IEEE Journal on Set. Areas in Comm., Vol. 8, No. 4, May 1990, pp. 641-649) has shown that, in a slotted CDMA (Code Division Multiple Access) with SIC, the optimal received signals power distribution is exponential i.e. for the n-th user the power $P_n$ is given by:

$$P_n = \left[\frac{E_s}{N_0}\right]_1 \left\{1 + \frac{1}{L_w}\left[\frac{E_s}{N_0}\right]_1\right\}^{n-1},$$

being $L_w$ the spreading factor, $$\left[\frac{E_s}{N_0}\right]_1$$

the symbol energy to thermal noise ratio for the lowest power user i.e. the one that will be decoded last in the SIC process. It is required that $$\left[\frac{E_s}{N_0}\right]_1 \geq \left[\frac{E_s}{N_0}\right]_{min},$$

where $$\left[\frac{E_s}{N_0}\right]_{min}$$

is the minimum required SNR for achieving the required PER in the absence of MAI (Multiple Access Interference). This approach, although optimum in terms of achievable sum rate, is very impractical as it requires coordination between the user terminals to ensure they transmit with a power level which grows exponentially with the user number. Furthermore there may be issues in providing the required transmitted EIRP (Effective Isotropic Radiated Power) dynamic range required as the maximum terminal EIRP grows exponentially with the number of active users (the terms "user", "terminal" and "user terminal" will be used indistinctly). See also;

G. Caire, S. Guemghar, A. Roumy, S. Verdu, "Maximizing the spectral efficiency of coded CDMA under successive decoding", IEEE Trans. On Information Theory, January 2004, pp. 152-164;

G. Caire, R. R, Muller, T. Tanaka, "Iterative multiuser joint decoding: Optimal power allocation and low-complexity implementation", IEEE Trans. On Information Theory, September 2004, pp. 1950-1973.

These works are based on assumptions which are incompatible with E-SSA and similar protocols:

The transmission is assumed to be continuous (in E-SSA it is bursty);

The transmission is typically slotted (in E-SSA it is unslotted);

The packets are transmitted using CDMA (in some E-SSA embodiments, a single spreading sequence can be used);

The transmit power levels are determined in a coordinated way between the users (in the case of the invention, coordination would be impractical and decentralized power control is required).

Moreover, at the receiver, "simple" SIC is considered, instead of iterative SIC as adopted in E-SSA.

A paper by J. Hou, J. E. Smee, H. D. Pfister and S. Tomasini, "Implementing Interference Cancellation to Increase the EV-DO Rev. A Reverse Link Capacity", IEEE Comm. Magazine, February 2006, pp. 96-102, discusses the implementation of SIC at the base station of a terrestrial mobile system is also operating in packet mode with asynchronous mode and with no coordination among the users. According to this document, in order to achieve the maximum sum rate capacity, the user packets shall arrive with a same power level. The statement is supported by a single example, but no evidence is provided allowing its generalization. The assertion is contradicted by the results that will be discussed here.

An object of the present invention, allowing to achieve the above-mentioned goal, is a method of transmitting data packets from a terminal to a gateway receiver over a channel shared with other terminals using an unslotted spread spectrum random access protocol, characterized in that transmission is performed at a transmit power level given by the sum of a deterministic term, function of a communication link budget, and of a random term, following a predetermined probability distribution, both said terms being expressed in decibels.

Another object of the invention is a method of operating a communication system comprising: using a plurality of terminals for transmitting data packets to a gateway receiver over a shared channel using an unslotted spread spectrum random access protocol; and using said gateway receiver to receive said data packets and detect them using (preferably iterative) successive interference cancellation; characterized in that each said terminal transmits said data packets using the above method.

Yet another object of the invention is a terminal comprising an emitter for transmitting data packets over a communication channel using an unslotted spread spectrum random access protocol and a processor for determining a transmit power level, said terminal being configured for carrying out such a method.

Yet another object of the invention is a communication system comprising a plurality of such terminals and a gateway receiver communicating over a shared communication channel, the gateway receiver comprising a detector for receiving and detecting data packets transmitted by said terminals over said shared communication channel using (preferably iterative) successive interference cancellation.

BRIEF DESCRIPTION OF THE DRAWINGS

Additional features and advantages of the present invention will become apparent from the subsequent description, taken in conjunction with the accompanying drawings, which show.

DETAILED DESCRIPTION

Figure 1A:
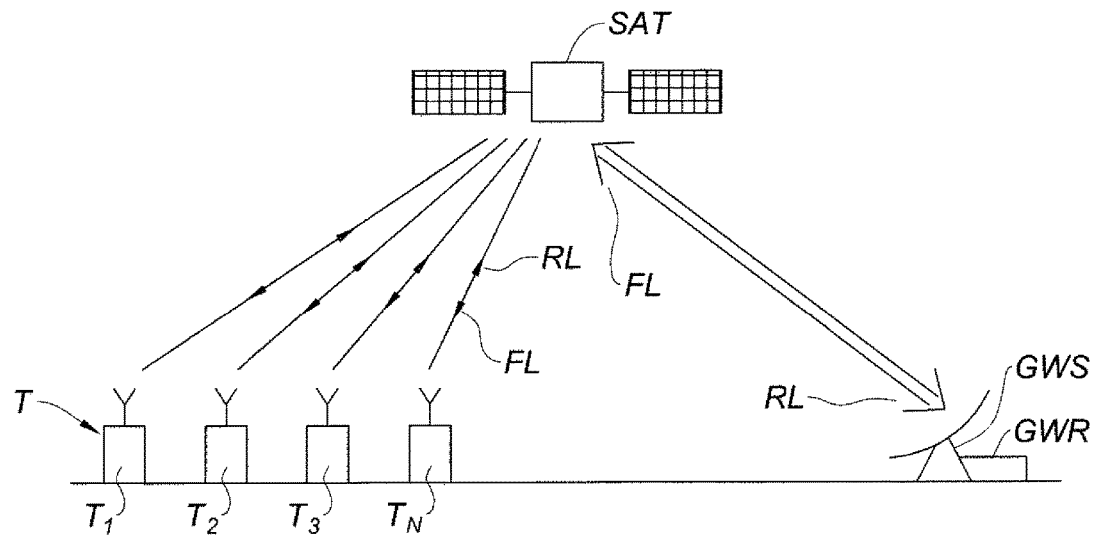
FIGS. 1A, 1B and 1C, block diagrams of a communication system according to the invention, a user terminal according to the invention and a gateway station of said communication system.
Figures 1B, 1C:
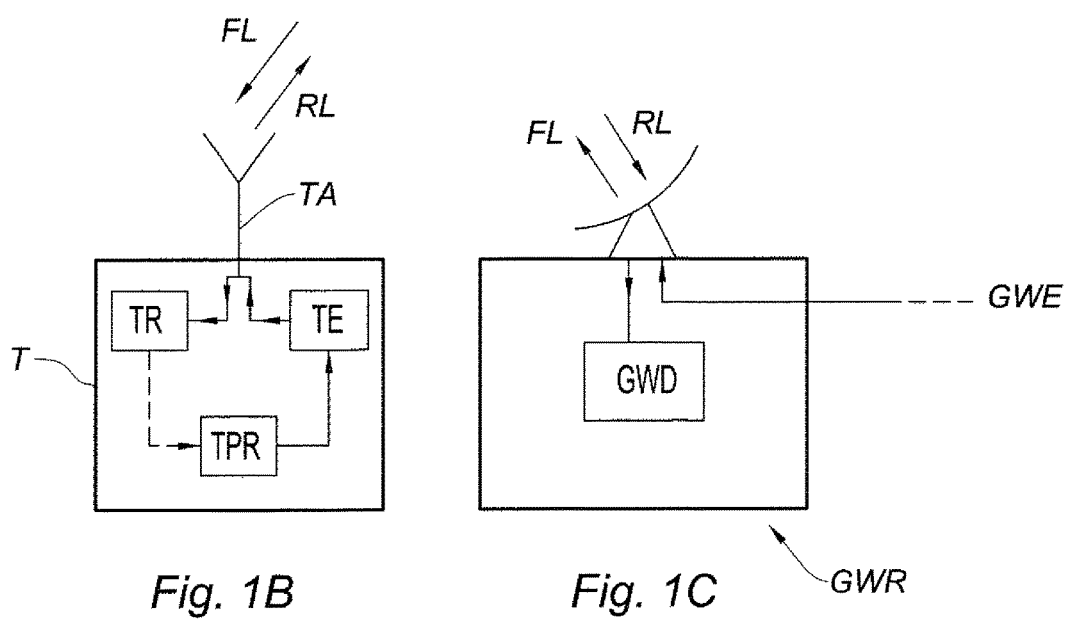

FIG. 1A represents, in a very schematic way, a satellite communication system suitable for carrying out the invention. The system comprises a set of user terminals $T_1$, $T_2$, $T_3 \ldots T_N$ (generally referred to as "T") and a gateway station GWS communicating through a satellite repeater SAT, which can be either transparent or regenerative. In the following for simplicity the description will be focused on the transparent satellite case. Also the satellite can include one or more user beams connected to the gateway. A multi-beam configuration allows reusing the user link frequency, thus increasing the overall system throughput given a user bandwidth. The gateway station uses an emitter (reference GWE on FIG. 1C) to broadcast data to the terminals through respective communication links called "forward links", FL. The forward link can also be used for sending packet reception acknowledgements to the terminals as well as any network ancillary signalling information. The terminals transmit data packets to the gateway station—and more precisely to a gateway receiver GWR—through respective communication links called "return links" RN using an unslotted spread-spectrum random access protocol, e.g. Spread-Spectrum Aloha, which requires no communication, coordination or synchronization between terminals. Such a protocol is efficient when the transmission duty ratio of each terminal (i.e. the fraction of the total time during which the terminal transmits over the return link) is small. The random access scheme allows collisions between data packets transmitted by different terminals, which can lead to the loss of said packets; in order to reduce the packet loss ratio, the gateway receiver GWR comprises a detector GWD (see FIG. 1C) which performs iterative serial interference cancellation, e.g. using the algorithm described in document EP 2 159 926.

An important aspect of the present invention is that the throughput of the return link (considered as a whole, i.e. the link between all the terminals and the gateway receiver) can be optimized by controlling in open loop fashion the transmit power of the terminals. Therefore, as illustrated on FIG. 1B, a generic terminal T comprises a processor TPR which drives an emitter TE according to a suitable algorithm, which will be described later. The power control depends on some characteristics of the return link: attenuation, noise level at the gateway receiver input, etc. These data can be broadcast by a central station (typically the gateway station itself) and/or be estimated by the terminal processor itself on the basis of the signal received through the forward link. For this reason, on FIG. 1B the processor TPR is represented with an input port connected to an output port of the terminal receiver TR. On this figure, the terminal receiver and emitter share a same antenna TA, but this is not essential.

The detailed description of the invention will comprise three parts:

in a first part, the optimal power distribution of the data packets at the input of the gateway receiver will be derived;

in a second part, different transmit power control algorithms will be illustrated; and a third part will demonstrate the technical results of the invention by presenting simulations and experimental data.

In order to derive the optimal power distribution at the input of the gateway receiver, it will be assumed that data packets detection is performed in a time window k spanning 3 packet lengths, and that M incoming packets are present at the gateway demodulator. As the system is asynchronous (unslotted), the packet arrival density follows a Poisson distribution and, for a given traffic load G, is given by $\lambda_t=2GG_p$ being $G_p$ the processing gain expressed as the ratio between the chip and bit rate of the spread-spectrum system.

See O. Del Rio Herrero, R. De Gaudenzi "High Efficiency Satellite Multiple Access Scheme for Machine-to-Machine Communications", IEEE Transactions on Aerospace and Electronic Systems, Vol. 4, Issue: 4, Pages 2961-2989, October 2012

In general the number of incoming packets is also time-variant although, considering the E-SSA high-level of traffic aggregation, the fluctuations are limited in percentage of the average number of packets even in the presence of Poisson type of traffic. In the following, said number of incoming packets will be assumed constant in order to simplify the notation but without loss of generality.

Each interfering packet l belonging to the time window k is characterized by its power $P(k,f)$ and by the associated relative normalized packet overlap factor $\theta(k,l,n)$ related to the current packet of interest n. It will be assumed that $\theta(k,l,n)$ is a random variable uniformly distributed in [0,1], "0" meaning no overlap and "1" full packet overlap. In case of a conventional Single User Detector (SUD) the SNIR for the current packet of interest n in the time window k is given by:

$$SNIR(k, n) = \frac{P(k, n)}{R_s \left[ N_0 + \frac{1}{R_c} \sum_{l=1, l \neq n}^{M} P(k, l) \vartheta(k, l, n) \right]} = \quad (1)$$

$$\frac{\left[\frac{E_s}{N_0}\right]_{nom} \alpha(k, n)}{1 + \frac{1}{L_w}\left[\frac{E_s}{N_0}\right]_{nom} \sum_{l=1, l \neq n}^{M} \alpha(k, l)\vartheta(k, l, n)},$$

$$\left[\frac{E_s}{N_0}\right](k, n) = \frac{P(k, n)}{R_s N_0} = \frac{P_{nom}\alpha(k, n)}{R_s N_0} = \left[\frac{E_s}{N_0}\right]_{nom} \alpha(k, n),$$

where $0 \leq \alpha(k,n) \leq \infty$ represents the power fluctuation factor of the received packet n in time window k around its nominal value, $L_w$, is the spreading factor defined as the chip over the symbol rate ratio, $R_s$ is the symbol rate, $E_s$ is the symbol energy, $N_0$ is the thermal noise power spectral density, $[E_s/N_0]_{nom}$ and $P_{nom}$ are respectively the nominal received packet $[E_s/N_0]$ and power when $\alpha(k,n)=1$.

If SIC is performed, the calculation gets slightly more involved as the incoming packets are re-ordered according to their power, and the Multiple Access Interference (MAI) from non-decoded packets and the residual MAI from previous cancellations must be taken into account at each packet detection step. Analytically the SIC SNIR for packet of interest n in the time window k is given by:

$$SNIR\left(k, n, \overline{\alpha}(k), \beta, \left[\frac{E_s}{N_0}\right]_{nom}\right) = \quad (2)$$

$$\frac{P^o(k, n)}{R_s \left\{ N_0 + \frac{1}{R_c} \left[ \sum_{l=1}^{n-1} P^o(k, l) \vartheta^o(k, l, n) + \beta \sum_{l=n+1}^{M} P^o(k, l) \vartheta^o(k, l, n) \right] \right\}} =$$

$$\frac{\left[\frac{E_s}{N_0}\right]_{nom} \alpha^o(k, n)}{1 + \frac{1}{L_w}\left[\frac{E_s}{N_0}\right]_{nom} \left[ \sum_{l=1}^{n-1} \alpha^o(k, l)\vartheta^o(k, l, n) + \beta \sum_{l=n+1}^{M} \alpha^o(k, l)\vartheta^o(k, l, n) \right]},$$

$$\left[\frac{E_s}{N_0}\right]^o(k, n) = \frac{P^o(k, n)}{R_s} = \frac{P_{nom}\alpha^o(k, n)}{R_s} = \left[\frac{E_s}{N_0}\right]_{nom} \alpha^o(k, n),$$

$$\overline{\alpha}(k) = [\alpha(k, 1), \alpha(k, 2) \ldots \alpha(k, n)],$$

where $P^o(k,n)$ is the re-ordered element of the received incoming packets so that: $P^o(k,1) \geq P^o(k,M), \ldots \geq P^o(k,M)$, where $\alpha^o(k,l)$ and $\theta^o(k,l)$ are re-ordered accordingly and $\beta$ is the power cancellation factor, $\beta=0$ corresponding to ideal SIC and $\beta=1$ corresponding to a Single User Detector (SUD).

Maximum throughput is achieved when the difference in the SNIR experienced by the different packets following the SIC process is minimized.

It is useful, then, to introduce the variable $\Delta$SNIR, defined as:

$$\Delta SNIR\left(\overline{\alpha}, M, \beta, \left[\frac{E_s}{N_0}\right]_{nom}\right) = \quad (3)$$

$$Max_n\left\{E_k\left\{SNIR\left(k, n, \overline{\alpha}(k), M, \beta, \left[\frac{E_s}{N_0}\right]_{nom}\right)\right\}\right\} -$$

$$Min_n\left\{E_k\left\{SNIR\left(k, n, \overline{\alpha}(k), M, \beta, \left[\frac{E_s}{N_0}\right]_{nom}\right)\right\}\right\},$$

where $\overline{\alpha}$ represents a specific distribution of the array of random variables $\overline{\alpha}(k)$.

The optimum packet power offset distribution $\overline{\alpha}_{opt}$ is therefore defined as the one which minimized the function $$\Delta SNIR\left(\overline{\alpha}, M, \beta, \left[\frac{E_s}{N_0}\right]_{nom}\right)$$

subject to different constraints depending on the type of SIC algorithms adopted. Alternatively, one can also consider minimizing the standard deviation of the SNIR random variable. In this case the quantity to be minimized instead of $\Delta$SNIR derived from (3) is given by $\sigma_{SNIR}$ computed as:

$$\sigma_{SNIR}\left(\overline{\alpha}, M, \beta, \left[\frac{E_s}{N_0}\right]_{nom}\right) = \quad (3\text{-a})$$

$$\sqrt{E_n\left\{\left[E_k\left\{SNIR\left(k, n, \overline{\alpha}(k), M, \beta, \left[\frac{E_s}{N_0}\right]_{nom}\right)\right\} - \mu_{SNIR}\right]^2\right\}}$$

$$\mu_{SNIR} = E_n\left\{E_k\left\{SNIR\left(k, n, \overline{\alpha}(k), M, \beta, \left[\frac{E_s}{N_0}\right]_{nom}\right)\right\}\right\},$$

For a "conventional" SIC detector—i.e. a detector performing a single SIC iteration, wherein packets are ranked according to their SNIR and detection and interference removal start from the best quality packet and end with the last detectable one—the condition to be verified is the following:

$$\Delta SNIR_{min}\left(\overline{\alpha}_{opt} \mid M, \beta, \left[\frac{E_s}{N_0}\right]_{nom}\right) = \min_{\overline{\alpha}}\left\{\Delta SNIR\left(\overline{\alpha}, M, \beta, \left[\frac{E_s}{N_0}\right]_{nom}\right) \mid \quad (4)\right.$$

$$\left. \min_{k,n}\left\{SNIR\left(k, n, \overline{\alpha}, M, \beta, \left[\frac{E_s}{N_0}\right]_{nom}\right)\right\} \geq \left[\frac{E_s}{N_0}\right]_{min}^{FEC}\right\}$$

where the constraint:

$$\min_{k,n}\left\{SNIR\left(k, n, \overline{\alpha}, M, \beta, \left[\frac{E_s}{N_0}\right]_{nom}\right)\right\} \geq \left[\frac{E_s}{N_0}\right]_{min}^{FEC}$$

ensures that the worst case SIC SNIR is above the FEC (Forward Error Correction) threshold $$\left[\frac{E_s}{N_0}\right]_{min}^{FEC}$$

to achieve the target FER (Frame Error Rate). In the following, the expressions "Frame Error Rate" (FER), "Packet Error Rate" (PER) and "Packet Loss Rate" (PLR) are used as synonyms.

In case of iterative SIC (see e.g. the E-SSA protocol of EP 2 159 926), wherein detection involves several complete SIC cycles through the window memory to reduce the packet loss ratio (PLR), the condition to be verified are the following:

$$\Delta SNIR_{min}\left(\overline{\alpha}_{opt}, |M, \beta, \left[\frac{E_s}{N_0}\right]_{nom}\right) = \tag{5}$$

$$\min_{\overline{\alpha}}\left\{\begin{array}{l}\Delta SNIR\left(\overline{\alpha}, M, \beta, \left[\frac{E_s}{N_0}\right]_{nom}\right)\\ \min_{k,n}\left\{SNIR\left(k, n, \overline{\alpha}, M, \beta, \left[\frac{E_s}{N_0}\right]_{nom}\right)\right\} \geq \left[\frac{E_s}{N_0}\right]_{min}^{SIC},\\ \min_{k}\left\{SNIR\left(k, M, \overline{\alpha}, M, \beta, \left[\frac{E_s}{N_0}\right]_{nom}\right)\right\} \geq \left[\frac{E_s}{N_0}\right]_{min}^{FEC}\end{array}\right\}$$

The first constraints ensure the triggering the SIC process i.e.:

$$\min_{k,n}\left\{SNIR\left(k, n, \overline{\alpha}, M, \beta, \left[\frac{E_s}{N_0}\right]_{nom}\right)\right\} \geq \left[\frac{E_s}{N_0}\right]_{min}^{SIC} \tag{5-a}$$

Typically, the required SNIR $$\left[\frac{E_s}{N_0}\right]_{min}^{SIC}$$

corresponds to the achievement of a PLR of 0.9. Clearly $$\left[\frac{E_s}{N_0}\right]_{min}^{SIC} < \left[\frac{E_s}{N_0}\right]_{min}^{FEC},$$

thus this constraint is more relaxed than the one applicable to conventional SIC demodulator.

The second constraint is similar to the first one, except in that it is only applied to the last step (packet M) of the iterative SIC process, when all interferers (ordered according to their decreasing SNIR) have been removed:

$$\min_{k}\left\{SNIR\left(k, M, \overline{\alpha}, M, \beta, \left[\frac{E_s}{N_0}\right]_{nom}\right)\right\} \geq \left[\frac{E_s}{N_0}\right]_{min}^{FEC} \tag{5-b}$$

Figure 13:
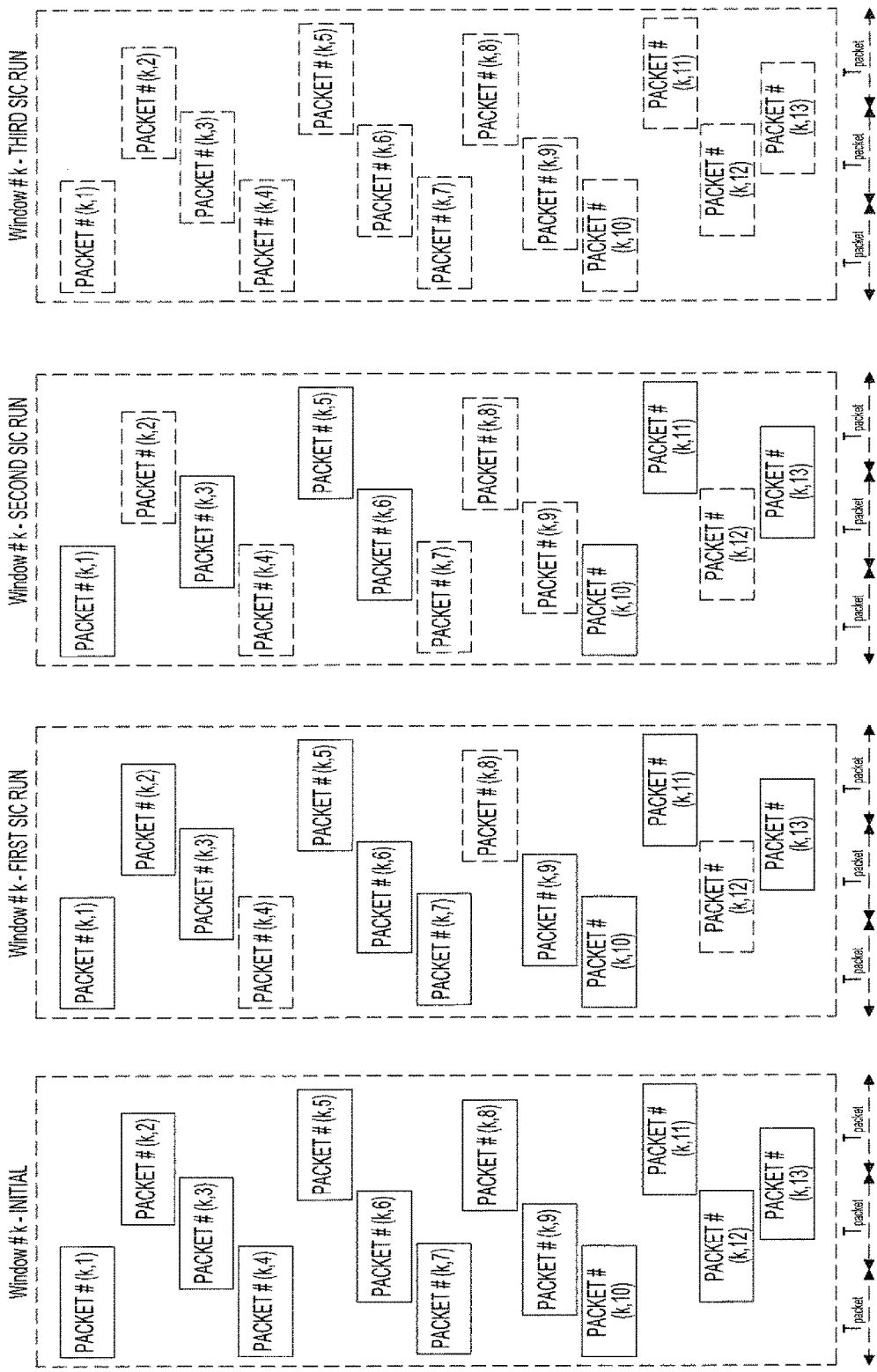
FIG. 13, an illustration of iterative SIC.

The conjecture above is based on the hypothesis that the E-SSA repetitive SIC process will converge provided that the first constraint is satisfied. The difference between a conventional SIC process and the E-SSA iterative SIC process will be better clarified by the example illustrated on FIG. 13. The figure refers to a simplified case where 13 packets are present in window k during the E-SSA iterative SIC (i-SIC) processing. The initial condition (first panel of the figure) is the situation corresponding to the memory window k before starting the I-SIC processing. In run 1 corresponding to conventional SIC processing) the gateway detector starts looking for the packet preambles and if a preamble is detected, packet detection is attempted. If and only if the packet preamble is detected and the Cyclic Redundancy Check (CRC) is successfully completed, the packet will be considered detected and cancelled from the window memory. Then the preamble searcher is continuing to search forward in the memory for new packets until the end of window is reached (see document EP 1 686 746 for more details on the processing). With high MAC loads as in the present example following the example reported only 3 out of the 13 packets more precisely packets (k,4), (k,8) and (k,12) are detected and cancelled (second panels; packet with dotted contour). The other 10 remain undetected. The ones detected are typically the ones with higher SNIR but also assuming the initial SIC run SNIR provides a PER of 0.9 it means that in average only 1 out of 10 packets will be successfully decoded. In run 2 (third panel) the process is repeated starting from the beginning of the window k. Because of the previous SIC run, the SNIR of the packets is better, and more of them can be decoded during said second SIC run. Specifically, in this exemplary case, packets (k,2), (k,7) and (k,9) are detected. Finally in the third SIC run (fourth panel) all the window packets are decoded and cancelled. At this point, following the E-SSA algorithm described in EP 1 686 746, the processing window is shifted by a fraction of the packet length (typically half) and the previous i-SIC process is repeated on the shifted memory window.

It is apparent that the i-SIC process described in the example works differently from conventional SIC corresponding to the sole run 1 of the i-SIC. To trigger the i-SIC convergence it is sufficient that the highest SNIR initially experienced is allowing to detect a certain percentage (say 10%) of the packets present in the window. Their removal will allow to progressively detect the others through the iterative SIC processing. Instead with normal SIC processing the best SNIR for each packet shall give the final target PLR (say $10^{-4}$) thus representing a much more stringent condition. This condition is typically satisfied with a lower maximum throughput.

The system capacity is optimized looking at the maximum load (M or G) for which an optimum power distribution $\overline{\alpha}_{opt}$ can be found, satisfying the appropriate constraints.

Without additional hypothesis, finding $\overline{\alpha}_{opt}$ is a complex problem. However, it can be simplified by assuming an a priori power distribution depending on one or more parameter to be optimized. In practice, as it will be discussed below, numerical simulations show that optimal or at least near-optimal performances can be achieved by using a packet power distribution which is uniformly distributed, in decibels, between a minimum value $\alpha_{min}$ and a maximum value $\alpha_{max}$. The problem of finding $\bar{\alpha}_{opt}$ is then reduced to the determination of optimal values for $\alpha_{min}$ and $\alpha_{max}$. It should however be noted that in some cases different transmit power distributions can be preferred, e.g. to compensate a distortion of the initial packet power distribution induced by the communication system.

Having found a method for determining the optimal power distribution of data packets at the gateway receiver input, one is faced with the problem of achieving this optimal distribution without relying on coordination between the user terminals. A solution to this problem will be provided below. This solution allows achieving the required power distribution even in the presence of atmospheric fading, non-uniform satellite antenna gain pattern and user terminal RF power limitations. Moreover, it does not require information about the individual user terminal power settings, it supports different classes of services (bit rates) and allows operations at distinct downlink and uplink frequencies. It is particularly suitable for fixed satellite systems which do not experience fading/shadowing due to the user mobility, but only time and location dependent attenuation due to atmospheric fading and to the variability of satellite receive antenna gain and geometrical path loss. More precisely, the inventive method is particularly well suited for a fixed system in the Ka, Ku or C-band, where differently from a land mobile satellite channel atmospheric fading is a relatively rare and relatively slow event. This makes possible to track the downlink fading evolution and counteract it using the set of equations illustrated in the following to counteract it and to allow in a certain fading range to still obtain the wanted random packet power distribution at the gateway demodulator. Instead in a truly satellite mobile system operating in a non-open sky channel condition the fading/shadowing process variation speed is typically too high to be tracked and counteracted by the open loop scheme described in the following. In such a case, typically, only on-off transmission control can be implemented.

In a first embodiment of the inventive power control method, there is no limitation of the user terminal transmit power. In this case, the transmit power level $P_{Tx}$ is equal to a "required" value $[P_{Tx}]_{req}$:

$$P_{Tx} [dBm] = [P_{Tx}]_{req} [dBm] \quad (6)$$

where $[P_{Tx}]_{req}$ is expressed as the sum of a "deterministic" term $[P_{Tx}]^T_{req}$ and a "random" one, $R_{rand}$, both expressed in decibels:

$$[P_{Tx}]_{req} [dBm] = [P_{Tx}]^T_{req} [dBm] + R_{rand}(S_{type}) [dB] \quad (7)$$

where $S_{type}$ indicates the selected packet service quality (e.g. standard, degraded, upgraded).

The deterministic term depends on the communication link budget, and can be expressed as:

$$[P_{Tx}]^T_{req}[dBm] = L_{up}(L_{down}, f_{down}, f_{up})[dB] + \quad (8)$$
$$N_{SAT}(dBm) + \left[\frac{C}{N_0}\right]_T (S_{type})[dB] - G_S(x_u, y_u)[dB]$$

where $$\left[\frac{C}{N_0}\right]_T (S_{type})$$

is the target packet $C/N_0$ (carrier-to-noise power spectral density ratio) for a selected service, $G_s(x_u, y_u)$ is the satellite antenna gain at EOC (Edge of Coverage) and $L_{up}$ is the uplink attenuation, expressed as a function of the downlink attenuation (which can be estimated by the terminal receiver using conventional techniques), the downlink frequency $f_{down}$ and the uplink frequency $f_{up}$ and $N_{sat}$ is the noise power at the input of the satellite transponder.

The random term $R_{rand}$ follows a pre-set probability distribution, and more particularly the optimal distribution $\bar{\alpha}_{opt}$ determined by the method described above (or a different distribution, if this is preferred in some specific application). According to the numerical results shown later on, and assuming that the antenna gain variation within the coverage region is limited, $R_{rand}$ is preferably a uniformly distributed random value between $\alpha_{min}(S_{type})$ [dB] and $\alpha_{max}(S_{type})$ [dB] which is generated by the terminal. The notation underlines that the values of $\alpha_{min}$ and $\alpha_{max}$ are determined by the terminal as a function of the service type $S_{type}$.

The downlink and uplink attenuation can be estimated as:

$$L_{down} = 10^{\frac{P^{SAT}_{EIRP}(dBW) + \left[\frac{G}{T}\right]_{UT}(dB/K) - [SNR]_{UT}(dB)}{10}}, \quad (9)$$

$$L_{up}(L_{down}, A_{down}, f_{down}, f_{up}) =$$
$$10\log_{10}[L^{nom}_{up}(L_{down}, A_{down}, f_{down}, f_{up}) A_{up}(f_{down}, f_{up})],$$

$$L^{nom}_{up}(L_{down}, A_{down}, f_{down}, f_{up}) = L^{nom}_{down}(L_{down}, A_{down})\left(\frac{f_{up}}{f_{down}}\right)^2,$$

$$L^{nom}_{down}(L_{down}, A_{down}) = \frac{L_{down}}{A_{down}},$$

$$A_{up}(f_{down}, f_{up}) = 10^{-\frac{C_2(f_{down}, f_{up})}{10}},$$

$$C_2(f_{down}, f_{up}) = C_1 \left[\frac{\phi(f_{up})}{\phi(f_{down})}\right]^{1-H(\phi(f_{down}), \phi(f_{up}), A_1)},$$

$$C_1 = -10\log_{10}\{A_{down}\},$$

$$\phi(f) = \frac{f}{1 + 10^{-4}f^2},$$

$$H(\phi(f_{down}), \phi(f_{up}), C_1) = 0.0012\left[\frac{\phi(f_{up})}{\phi(f_{down})}\right]^{0.5} [\phi(f_{down})C_1]^{0.55},$$

where $P^{SAT}_{EIRP}$ is the satellite user downlink Effective Isotropic Radiated Power (EIRP), $$\left[\frac{G}{T}\right]_{UT}$$

is the terminal gain over thermal noise temperature, $[SNR]_{UT}$ is the signal-to-noise ratio estimated at the user terminal, $A_{down}$ and $L_{down}$ are the current estimate downlink fading and overall downlink path loss (including fading), $C_1$ and $C_2$ are the rain attenuation coefficients expressed in dB for the downlink and the uplink respectively and $f_{down}$ and $f_{up}$ are the downlink and uplink carrier frequencies expressed in GHz.

The value of the $P^{SAT}_{EIRP}$, $N_{SAT}$, $$\left[\frac{C}{N_0}\right]_T$$

($S_{type}$) and $P_{EIRP}^{SAT}$ are broadcasted by the gateway station through specific signalling tables. The $$\left[\frac{G}{T}\right]_{UT}$$

is assumed to be known at the terminal. For what concerns the satellite antenna gain $G_S(x_u, y_u)$ it has to be computed from the approximate user location knowledge and the nearest value available from the broadcasted satellite antenna gain map for discrete locations over the coverage area. The proposed approach is able to work also in case there is a non-congruent forward and return link antenna pattern.

Figure 2A:
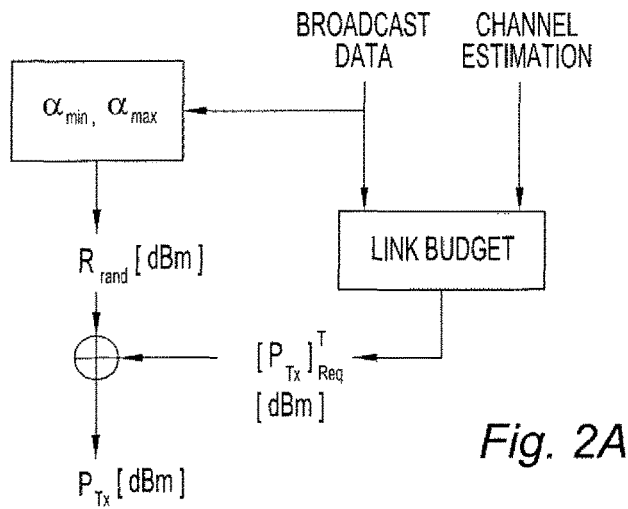
FIGS. 2A, 2B and 2C, blocks diagrams of a first, second and third embodiments of a method of transmitting data packets according to the invention.

A flow chart of this simple power control algorithm is illustrated on FIG. 2. Broadcast data ($S_{type}$) are used to determine the optimal values of $\alpha_{min}$ and $\alpha_{max}$, which in turn allows the random generation of $R_{rand}$; other broadcast data and results from downlink channel estimation allow performing a power budget, which in turn allows the determination of $[P_{Tx}]^T_{req}$; and the transmit power level is simply computed as the sum of these two terms, expressed in decibels (or, equivalently, their product if expressed in linear units).

In a more advantageous embodiment, the power control accounts for the maximum RF transmit power of the terminal, equal to $[P_{Tx}]^{max}$. Then the algorithm is modified as follows:

$$P_{Tx}[dBm] = \qquad (10)$$

$$\begin{cases} [P_{Tx}]_{req}[dBm] & \text{if } [P_{Tx}]^{max}[dBm] \geq [P_{Tx}]^T_{req}[dBm] + \\ & \alpha_{max}(S_{type})[dB] \\ \min\{[P_{Tx}]_{req}[dBm], & \text{if } [P_{Tx}]^T_{req}[dBm] + \alpha_{min}(S_{type})[dB] < \\ [P_{Tx}]^{max}[dBm]\} & [P_{Tx}]^{max}[dBm] < [P_{Tx}]^T_{req}[dBm] + \\ & \alpha_{max}(S_{type})[dB] \\ -\infty & \text{if } [P_{Tx}]^{max}[dBm] < [P_{Tx}]^T_{req}[dBm] + \\ & \alpha_{min}(S_{type})[dB] \end{cases}$$

where $[P_{Tx}]_{req}$ is computed as in the first embodiment (equations 6-8).

Figure 2B:
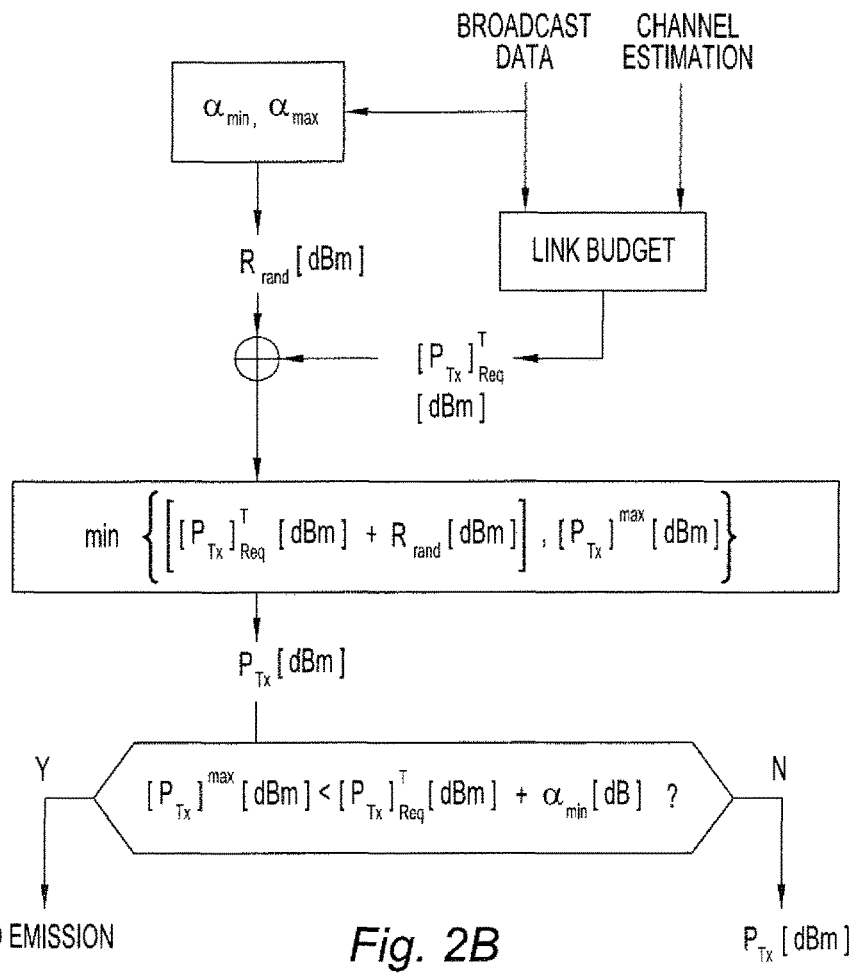
Figure 2C:
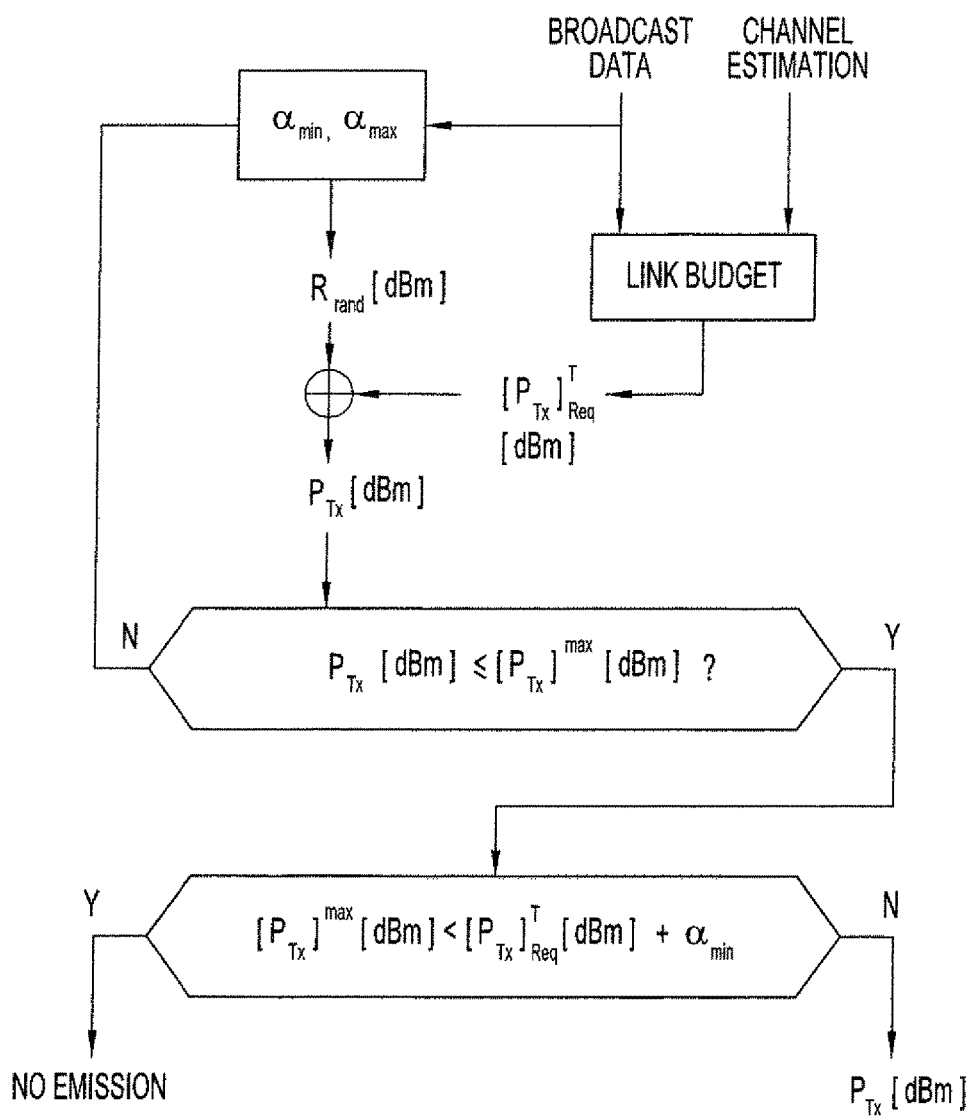

FIG. 2B shows a flow chart of this algorithm. Its first steps are the same as those of the first embodiment, but the transmit power $P_{Tx}$ is not simply given by the sum of the deterministic and random terms (in decibels); instead is given by the minimum between said sum and the maximum transmit power (or, equivalently, it is clipped at said maximum transmit power). Moreover, the algorithm includes an optional on/off controls which hinder data emission (in the mathematical expression of the algorithm, "no transmission" is represented by $P_{Tx} = -\infty$ dBm) if the power budget is too unfavourable; the checked condition is: $[P_{Tx}]^{max}$ [dBm]< $[P_{Tx}]_{Req}^T$ [dBm]+$\alpha_{min}$. If this condition is satisfied, even the lowest-possible value of $P_{Tx}$ ($[P_{Tx}]_{Req}^T$ [dBm]+$\alpha_{min}$) would be higher than the maximum transmit power (it should be recalled that $[P_{Tx}]_{Req}^T$ [dBm] is a function of the link power budget). In these conditions ("outage"), a transmitted data packet would have a low probability of being correctly detected and it would uselessly increase the interference level for other packets.

Typically the system shall be designed to allow under non-faded conditions to have a large percentage of users being able to operate in the first nominal mode ($P_{Tx} < [P_{Tx}]^{max}$) thus exploiting the nominal user terminal power dynamic range. The use of the second mode ($P_{Tx} = [P_{Tx}]^{max}$) causes a "distortion" of the incoming gateway packets power distribution function.

This distortion is avoided by the third embodiment, adopting the following power control algorithm:

$$P_{Tx}[dBm] = \begin{cases} [P_{Tx}]_{req}[dBm] & \text{if } [P_{Tx}]^{max}[dBm] \geq [P_{Tx}]^T_{req}[dBm] + \\ & \alpha_{max}(S_{type})[dB] \\ [P_{Tx}]^T_{req}[dBm] + & \text{if } [P_{Tx}]^T_{req}[dBm] + \alpha_{min}(S_{type})[dB] < \\ R^*_{rand}(S_{type})[dB] & [P_{Tx}]^{max}[dBm] < [P_{Tx}]^T_{req}[dBm] + \\ & \alpha_{max}(S_{type})[dB] \\ -\infty & \text{if } [P_{Tx}]^{max}[dBm] < [P_{Tx}]^T_{req}[dBm] + \\ & \alpha_{min}(S_{type})[dB] \end{cases} \quad (11)$$

where the random variable $R_{rand}^*(S_{type})$ [dB] is regenerated until the condition $[P_{Tx}]_{req}^T$ [dBm]+$R_{rand}^*(S_{type})$ [dB]$\leq$ $P_{Tx}^{max}$ [dBm] is verified. In this case the clipping function $\min\{[P_{Tx}]_{req}$ [dBm],$[P_{Tx}]^{max}$ [dBm]$\}$ is replaced by the generation of a new random variable $R_{rand}^*(S_{type})$ [dB] that falls within the allowed user terminal power dynamic range. A flow chart of this algorithm is illustrated on FIG. 2C. Like in the second embodiment, transmission can be forbidden in case of link outage. An equivalent (but less straightforward) implementation could use a re-scaling of the values $\alpha_{min}$ and $\alpha_{max}$ before computing $R_{rand}$.

In both the second and the third embodiment, if the current link attenuation is too large to make possible the packet transmission, the user terminal may switch to a more robust mode configuration, ensuring the a degraded service (in terms of bytes/packet and packet bit rate) and characterized by a lower target packet SNIR value and therefore by a higher service level availability i.e. 99.8% for the worst-month. Then, the transmit power is recomputed using the new $$\left[\frac{C}{N_0}\right]_T$$

($S_{type}$) value.

Conversely, if the estimated path attenuation is sufficiently low, the terminal can use an upgraded service mode, which higher number of bytes per packets and/or packet bit rate. This possibility applies to all the embodiments of the invention.

The technical result of the invention will now be assessed on the basis of computer simulations and experiments.

First of all, it will be shown that a uniform (in decibel) transmit power distribution is indeed optimal, or at least near-optimal, in realistic conditions.

Equation (5) will then be applied by considering six different a priori power distributions laws $\overline{\alpha}$:
1. Constant (no optimization parameters);
2. Exponential following eqn. (0), $$\left[\frac{E_s}{N_0}\right]_1$$

being the optimization parameter;
3. Lognormally distributed, with zero mean and standard deviation $\sigma$ [dB] (optimization parameter);

4. Truncated log normally distributed with zero mean and standard deviation σ [dB] (first optimization parameter) and |α| [db]≤α$_{max}$ [dB] (second optimization parameter);
5. Uniformly distributed in the dB domain with -α$_{max}$ [dB]≤α [dB]≤α$_{max}$ [dB].
6. Asymmetrically uniform distribution in the dB domain with α$_{min}$ [dB]≤α [dB]≤α$_{max}$ [dB].

The performances of these different power distributions are determined by numerical simulation and compared.

1. Constant Packet Power

The key system parameters have been taken using the link budget results of a realistic Ka-band multi-beam satellite. In particular, it was assumed $$\left[\frac{E_s}{N_0}\right]_{nom} = 9.2 \text{ dB}$$

(corresponding to the worst-case link budget $$\left[\frac{E_s}{N_0}\right]+3 \text{ dB}), \left[\frac{E_s}{N_0}\right]_{min}^{FEC} = -1.7 \text{ dB}$$

(corresponding to the 3GPP 100 information bits Forward Error Correcting (FEC) threshold for PER=10$^{-3}$ plus 0.5 dB implementation losses), $$\left[\frac{E_s}{N_0}\right]_{min}^{SIC} = -4.77 \text{ dB},$$

L$_w$=32, M=88×2=176. Initially perfect SIC (β=0) was assumed. The impact of imperfect SIC will be studied for the selected baseline configuration at the end of this section. The results related to this case are reported in FIGS. 3A and 3B.

Figure 3A:
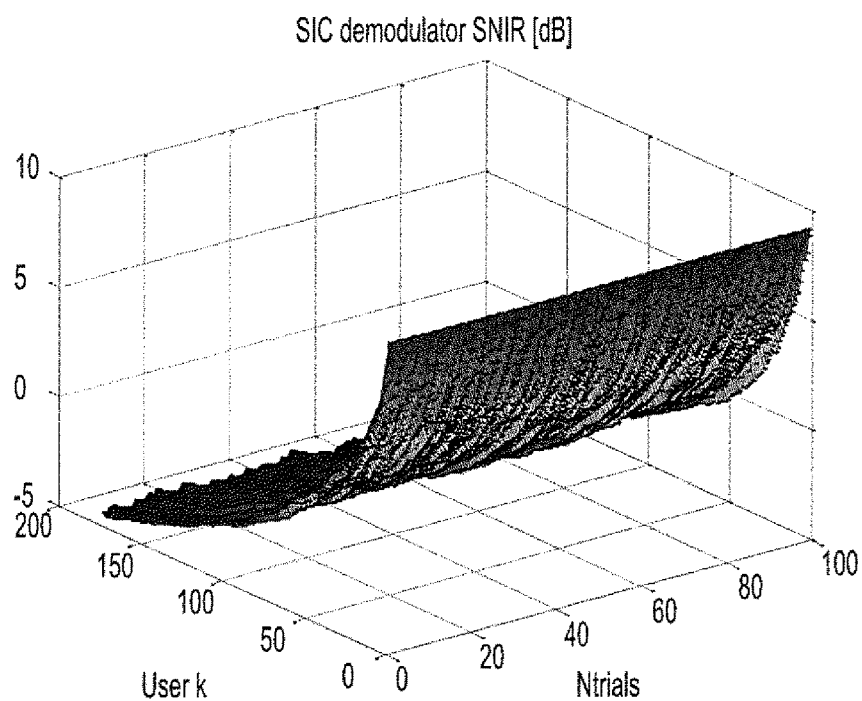
FIGS. 3A and 3B, two plots illustrating the user power distribution in a communication system according to a first comparative example.

FIG. 3A is a three dimensional plot showing the SNIR at the demodulator input and after SIC (vertical axis) for different users and for different trials. The users are ordered by decreasing SNIR.

Figure 3B:
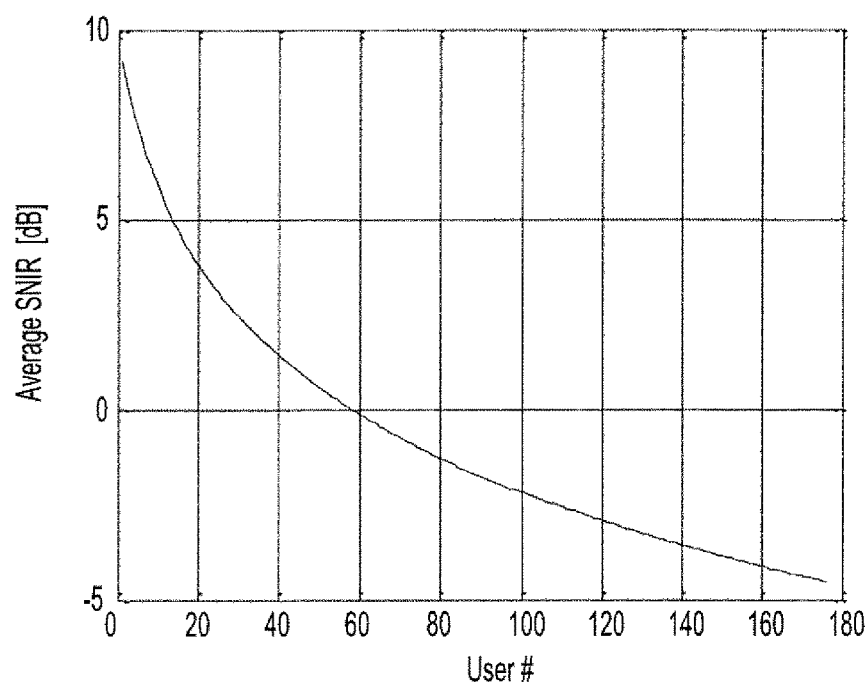

FIG. 3B shows the average SNIR and after SIC at the demodulator input for the different users. It can be seen on this figure that there is a large unbalance in terms of individual users SNIR i.e. ΔSNIR$_{min}$=13.7 dB. This makes the SIC detector operation very sub-optimum as at each IC stage the SNIR will improve until the last packet is detected. Furthermore, the worst-case SNIR is below the specified $$\left[\frac{E_s}{N_0}\right]_{min}$$

value as the resulting SNIR margin is -3.5 dB. The only way to make the margin positive is to reduce the number of simultaneous packets M which will result in a capacity reduction.

2. Exponential Power Distribution

Figure 4A:
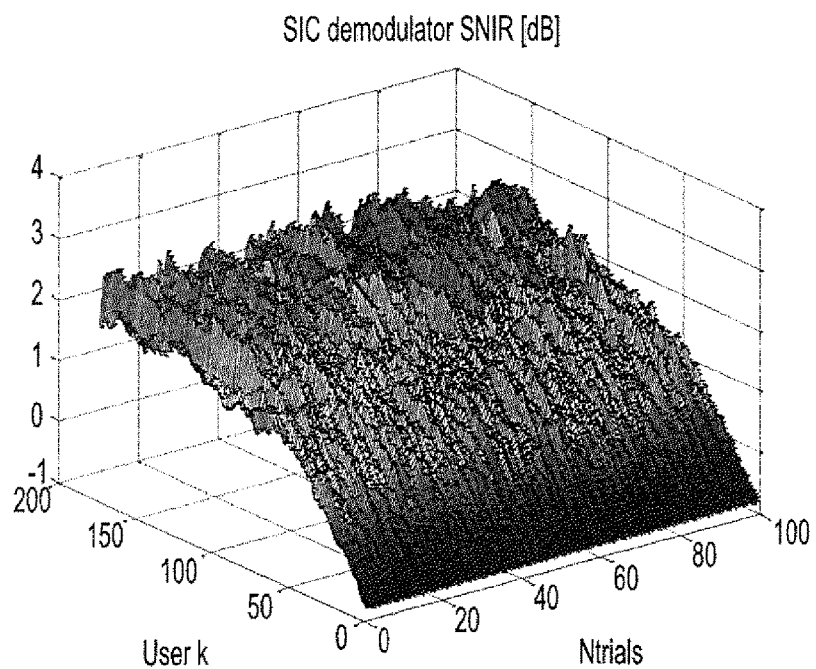
FIGS. 4A and 4B, two plots illustrating the user power distribution in a communication system according to a second comparative example.
Figure 4B:
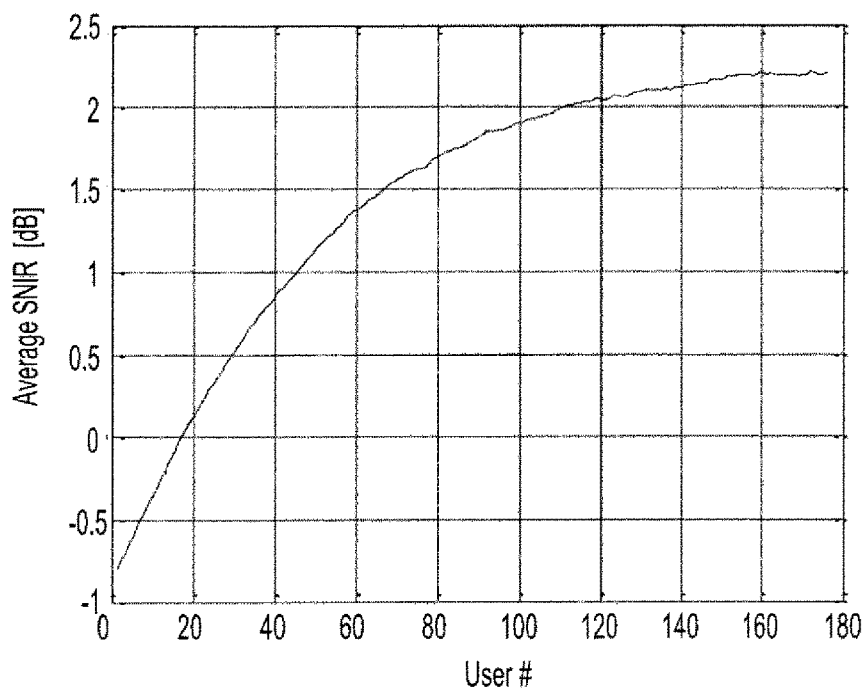

The results related to the case No. 2 correspond to a packet power growing exponentially with the user index are reported in FIGS. 4A and 4B. After some trials, it is obtained $$\left[\frac{E_s}{N_0}\right]_1 = -0.8 \text{ dB i.e.}$$

10 dB lower than $$\left[\frac{E_s}{N_0}\right]_{nom}.$$

It is apparent that the power dynamic range required spans almost 20 dB and 10 dB above the nominal power which makes this option possible. This approach guarantees a perfectly uniform SNIR(k,n) value when packets are synchronous. But when packets are asynchronous like in the present case the SNIR(k,n) values are not anymore constant thus the approach is sub-optimum. Furthermore the approach proposed by Viterbi requires coordination among users as each terminal shall know what power level is used by the others. This is an impractical situation. For the selected value of $$\left[\frac{E_s}{N_0}\right]_1 = -0.8 \text{ dB}$$

equation (5) provides a ΔSNIR$_{min}$=3.0 dB with a SNIR margin of 0.9 dB.

3. Lognormal Power Distribution

Figure 5A:
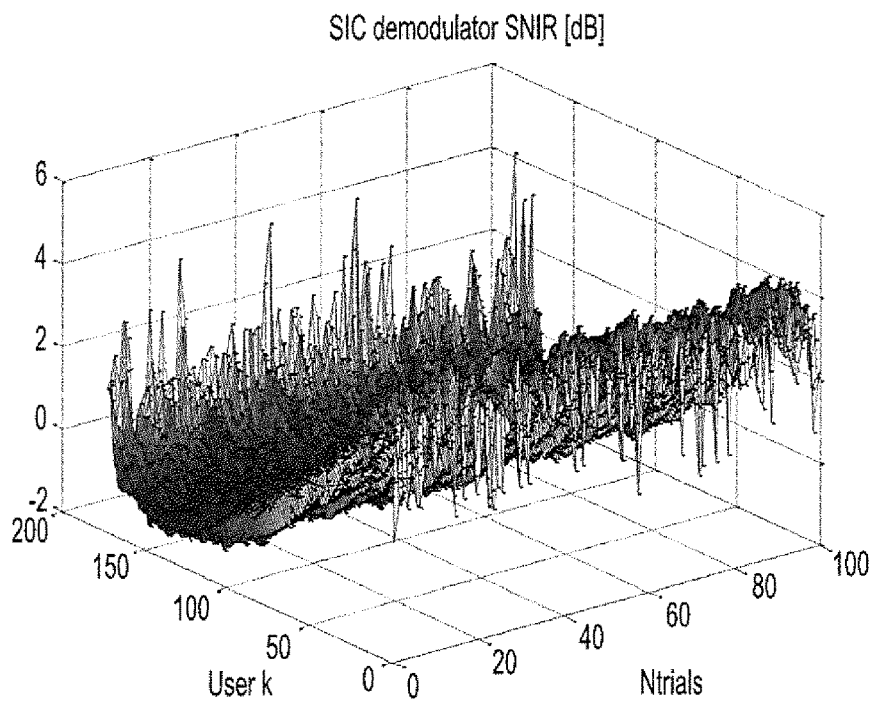
FIGS. 5A and 5B, two plots illustrating the user power distribution in a communication system according to a third comparative example.
Figure 5B:
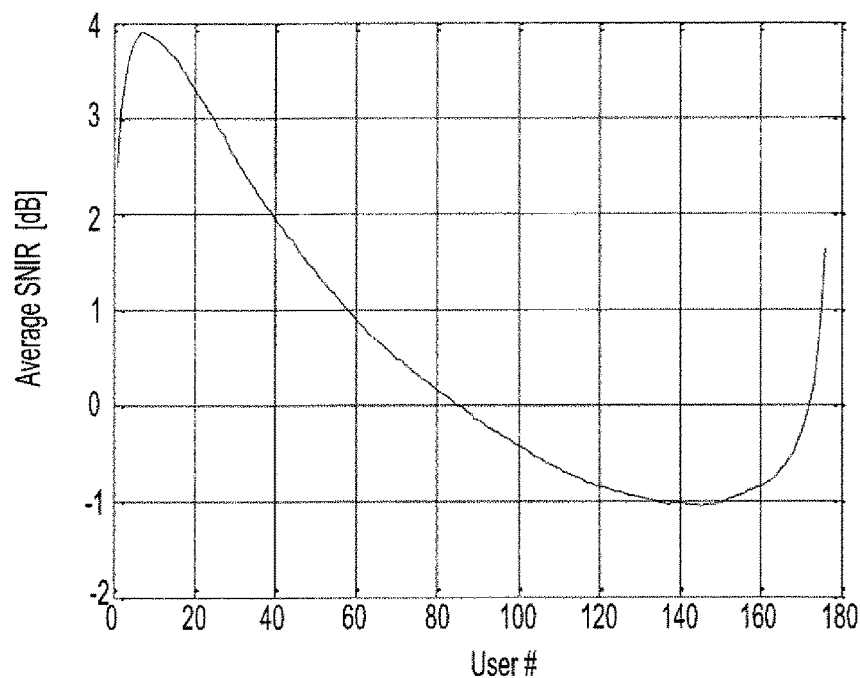

The results related to a packet power log normally distributed in the dB domain are reported in FIGS. 5A-5B. The minimum of equation (5) corresponding to ΔSNIR$_{min}$=4.9 dB has been obtained for σ=2.5 [dB] with a SNIR margin of -0.4 dB. It is quite interesting to observe the specific shape of the average SNIR plot reported in FIG. 5B. This distribution that can be approximately found in mobile application condition when the packet control scheme follows the one described in the above-referenced paper by O. Del Rio Herrero et al. Numerical findings clearly show that this incoming packet power distribution is sub-optimum in terms of SIC SNIR distribution across the different steps.

4. Truncated Lognormal Power Distribution

Figure 6A:
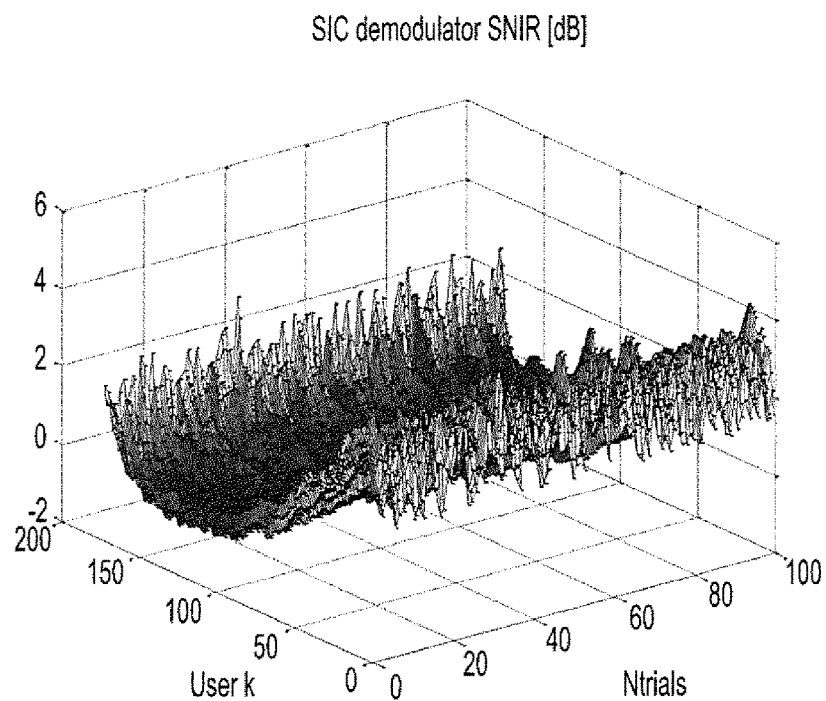
FIGS. 6A and 6B, two plots illustrating the user power distribution in a communication system according to a fourth comparative example.
Figure 6B:
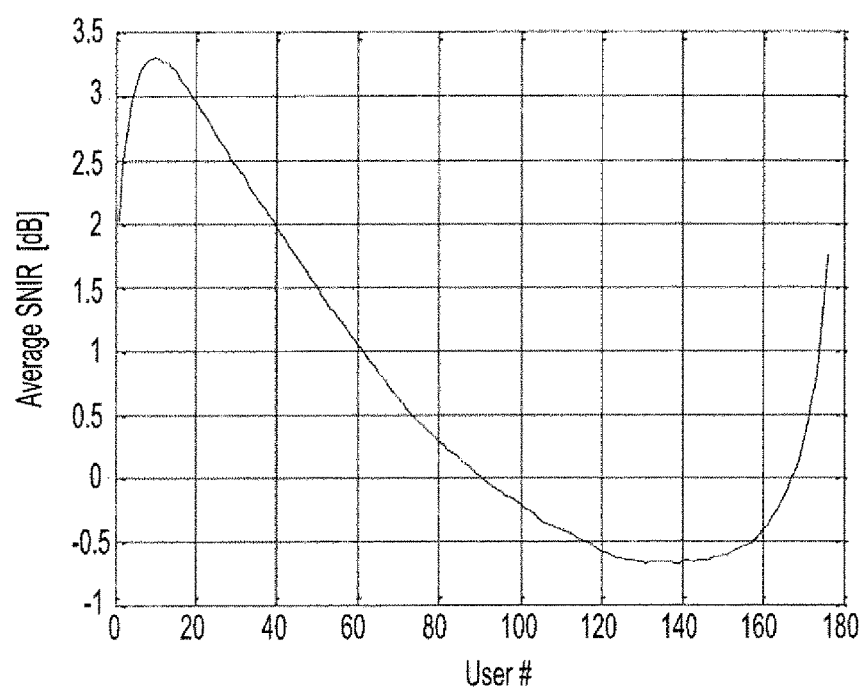

The results related to the case of packet power with truncated log normal distribution are reported in FIGS. 6A-6B. The minimum of equation (5) corresponding to ΔSNIR$_{min}$=3.95 dB has been obtained for σ=3.0 [dB] and α$_{max}$=8.0 [dB] with a SNIR margin of 0.01 dB. By clipping the log normal distribution, the SNIR fluctuation has been reduced by 1 dB, leading to a slightly positive link margin. Truncated log normal distribution can be considered a better power distribution than the pure log normal one.

5. Uniform Power Distribution (in the dB Domain)

Figure 7A:
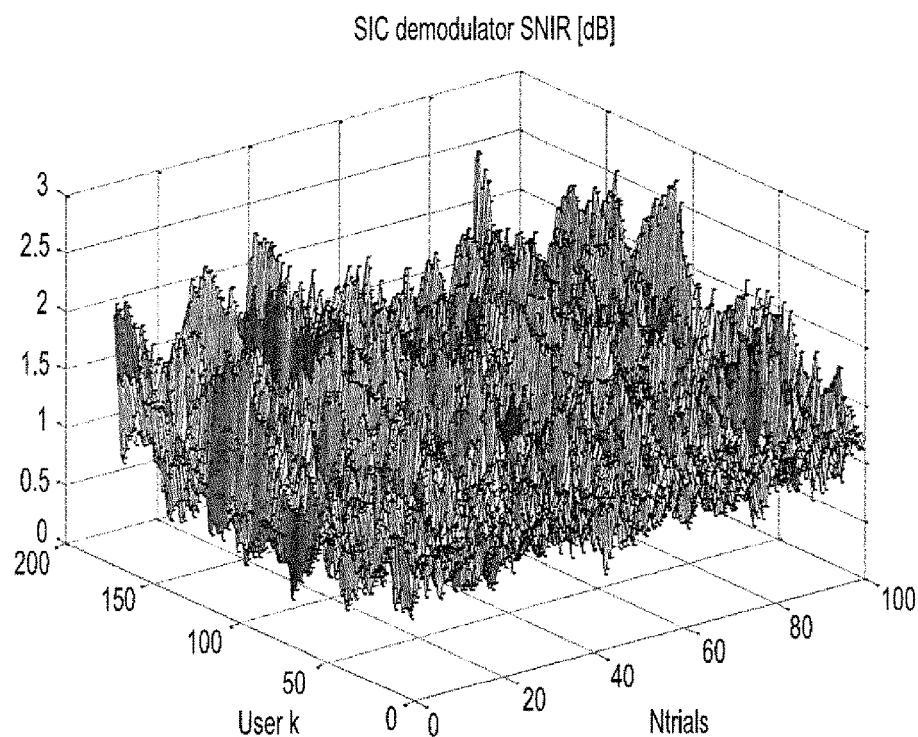
FIGS. 7A and 7B, two plots illustrating the user power distribution in a communication system according to a first exemplary embodiment of the invention.
Figure 7B:
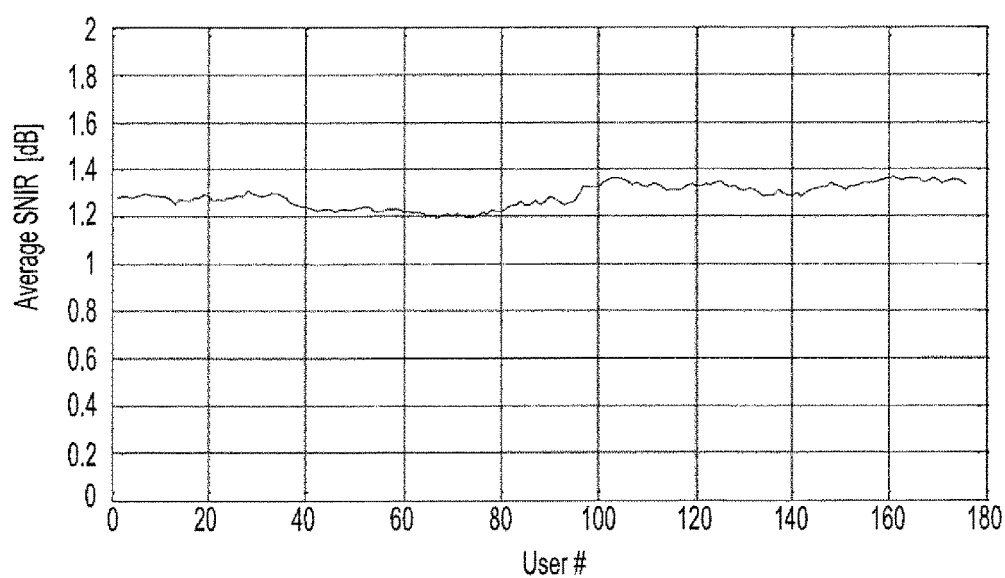

The results related to the case of packet power uniformly distributed in the dB domain are reported in FIGS. 7A-7B. The minimum of equation (5) corresponding to ΔSNIR$_{min}$=0.05 dB has been obtained for α$_{max}$=8.0 [dB] with a SNIR margin of 1.04 dB. This positive margin can be translated in an increased throughput. It is apparent that the uniform (in dB) power fluctuation distribution provides a very limited SIC SNIR excursion and a positive SNIR margin with a truly decentralized power randomization scheme. Therefore it is a practical approach to approximate the optimum SIC performance.

An additional case (5bis), related to the impact of the imperfect interference cancellation on the minimization of equation (5), has also been considered. Assuming $\beta=-15$ dB the findings of the $5^{th}$ case are changed as follows: The minimum of equation (5) corresponding to $\Delta SNIR_{min}=0.07$ dB has been obtained for $\alpha_{max}=6.0$ [dB] with a SNIR margin of 0.7 dB. The imperfect interference cancellation translates in a reduction by 0.5 dB of the SNIR margin while keeping the SNIR fluctuations across the different users very limited.

A summary of these results is provided in the following Table 1:

| Case | $[E_s/N_0]_1$ [dB] | $\sigma$ [dB] | $\alpha_{max}$ [dB] | $\alpha_{min}$ [dB] | $\beta$ [dB] | $\Delta SNIR_{min}$ [dB] | SNIR Margin [dB] |
|---|---|---|---|---|---|---|---|
| 1 | NA | NA | NA | NA | $-\infty$ | 13.7 | -3.5 |
| 2 | -0.8 | NA | NA | NA | $-\infty$ | 3.0 | 0.9 |
| 3 | NA | 2.5 | NA | NA | $-\infty$ | 4.9 | -0.4 |
| 4 | NA | 3.0 | 8.0 | NA | $-\infty$ | 3.95 | 0.01 |
| 5 | NA | NA | 8.0 | NA | $-\infty$ | 0.05 | 1.3 |
| 5-bis | NA | NA | 6.0 | NA | -15 | 0.07 | 0.7 |
| 6 | NA | NA | 3.0 | -9.2 | $-\infty$ | 0.1 | 0.5 | where "NA" means "non applicable" and case 6 will be discussed below.

It is apparent that the best performances are obtained for case 5 i.e. random uniform packet power distribution in the dB domain. This configuration is compatible with a random access (RA) system where there is no system coordination, but is affected by two major drawbacks:

The dynamic range for the packet power is quite large i.e. 16 dB peak to peak. This range, in many cases, is not compatible with user terminal EIRP limitations considering that the packet power shall be as high as +8 dB above the nominal value. When the $\alpha_{max}$ value is reduced to 4 dB the SIC performance are heavily degraded i.e. $\Delta SNIR_{min}=6.4$ dB with a SNIR margin of -0.6 dB.

The optimum value of $\alpha_{max}$ depends on the RA channel load. For example reducing the load to M=44×2=88 the minimum $\Delta SNIR_{min}=0.08$ dB is obtained with $\alpha_{max}=6$ dB to which corresponds $\Delta SNIR_{min}=-3.1$ dB. This problem can be solved by broadcasting the recommended $\alpha_{max}=6$ dB value in the forward link.

A possible way forward to solve the first issue identified on the maximum EIRP dynamic range is to use an asymmetric uniform power distribution between [$\alpha_{min}$ (dB), $\alpha_{max}$ (dB)] classified as case 6. It is assumed that physical limitations for the terminal EIRP impose $\alpha_{max}=3$ dB. In this case the minimization of eqn. (5) shall be performed with respect to parameter $\alpha_{min}$ (dB) Numerically it was found that the optimum value is $\alpha_{min}=-9.2$ dB $\Delta SNIR_{min}=0.1$ dB for which the SNIR margin is 0.5 dB. This is an excellent result as it optimizes all the system constraints with optimum SIC operating point. The results for case 6 are reported in 8A-8B (note that, in these figures, the scales are different from those of FIGS. 7A and 7B).

Increasing by 3 dB the value of $$\left[\frac{E_s}{N_0}\right]_{nom} \text{ i.e. } \left[\frac{E_s}{N_0}\right]_{nom} = 12.2 \text{ dB}$$

provides further room to increase the throughput. Numerically it was found that for M=125 e.g. 42% more load than the previous case can be supported with a positive minimum SIC SNIR margin of 0.1 dB. The optimum value for $\alpha_{max}=3$ dB is $\alpha_{min}=-12.7$ dB with $\Delta SNIR_{min}=0.15$ dB.

Increasing further by 3 dB the value of $$\left[\frac{E_s}{N_0}\right]_{nom} \text{ i.e. } \left[\frac{E_s}{N_0}\right]_{nom} = 15.2 \text{ dB}$$

(which appears compatible with the Ka-Sat link budgets: G/T variation of 10 dB from minimum to maximum with a G/T for 60% of the locations 6 dB above the minimum value used for the worst case link budgets) provides further room to increase the throughput. Numerically it was found that for M=185 e.g. 65% more load than the worst-case can be supported with a positive minimum SIC SNIR margin of 0.1 dB. The optimum value for $\alpha_{max}=3$ dB is $\alpha_{min}=-15.5$ dB with $\Delta SNIR_{min}=0.06$ dB.

It has to be remarked that the proposed transmit power control (or "physical layer adaptation") algorithm described above "equalizes" the loss differences between the different terminals thanks to the estimation of the uplink path loss. Thus, neglecting the power randomization $R_{rand}$, the power received at the gateway will be the nominal one unless the terminal is faded and cannot counteract fading with the uplink power control. Thus applying a uniform (in dB) power randomization at each terminal for each packet for each terminal will satisfy the conditions numerically derived above. As shown above the optimum randomization range in dB depends on the system load. However, to simplify the system implementation, the optimization of $R_{rand}$ is assumed to be performed for the maximum system load.

An overall E-SSA simulator based on the model already described in the above-referenced paper by O. Del Rio Herrero et al. has been exploited to assess the RA performance. First the MAC (Medium Access Control) throughput impact of the optimized incoming packet random distribution has been derived.

The first configuration adopted is described in table 2. It is to be remarked that in the simulation the information packet size is limited to 100 bits size packets so that results can be obtained by simulation and compared to previous finding obtained with log normal incoming packets power distribution. More specifically the uniform (in dB) power distribution optimum range is optimized for the target load condition always assuming $$\left[\frac{E_s}{N_0}\right]_{nom} = 13.7 \text{ dB}.$$

Figure 9A:
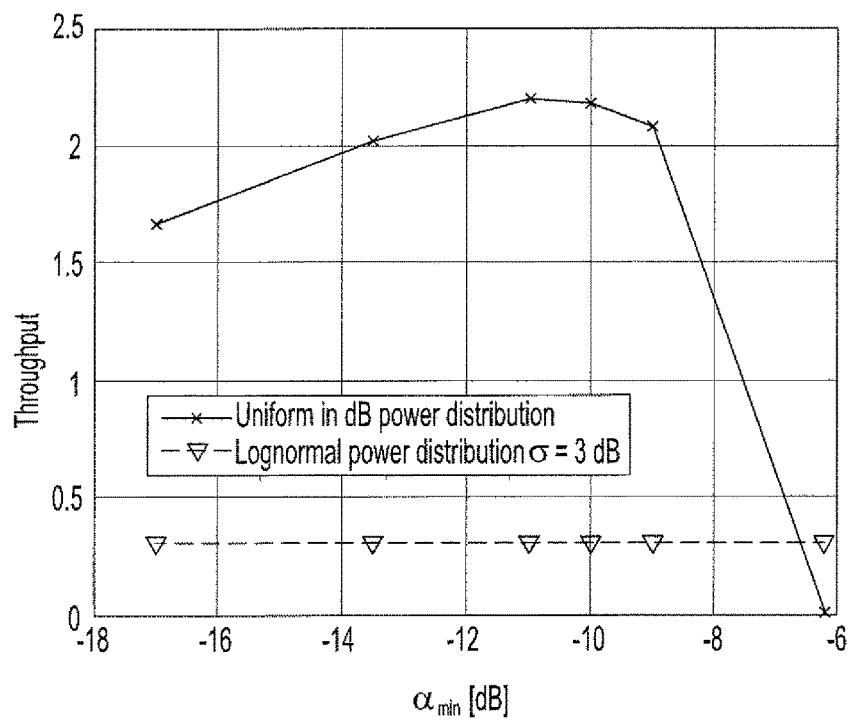
FIGS. 9A, 9B and 10A, 10B, plots illustrating the technical results of the invention, based on simulations.
Figure 9B:
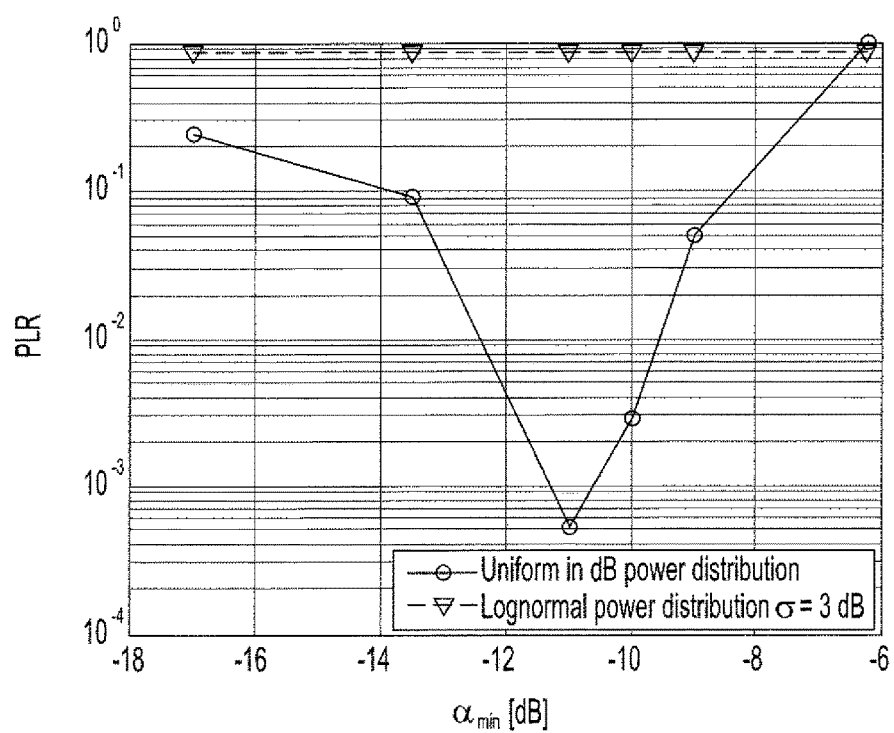

Even more specifically the load is kept constant G=2.2 b/s/Hz while the MAC throughput and PLR is simulated a function of the parameter $\alpha_{min}$ while $\alpha_{max}=3$ dB is kept constant. The simulator key parameters are listed in table 2 while the simulation findings are summarized in FIGS. 9A and 9B. FIG. 9A shows the simulated throughput using the E-SSA protocol with G=2.2 b/s/Hz as a function of $\alpha_{min}$ for uniform packet power distribution between $\alpha_{min}$ and $\alpha_{max}=3$ dB compared to a log normal power distribution with $\mu=-3$ dB and $\sigma=3$ dB. FIG. 9B shows the corresponding Packet Loss Ratio (PLR) values.

It is remarked that the approximated optimum value found by simulation of $\alpha_{min}=-11$ dB matches well the semi-analytical finding of $\alpha_{min}=-11.1$ dB following the procedure described above. It is to be remarked that the $\alpha_{min} = -11.1$ dB value is driven by the conditions imposed by equation (5-b) ensuring that the minimum SNIR is above the FEC threshold. This explains why below $\alpha_{min}$ the FER is growing.

Compared to log normal power distribution, optimized uniform (in dB) power distribution achieves a 1.5% MAC throughput improvement and we avoid the PLR floor effect due by the log normal packet power distribution described by the above-referenced paper by O. Del Rio Herrero et al.

TABLE 2

| |
|---|
| Simulation duration = 15600 [symbols] |
| Normalized MAC load G = 2.20 [b/s/Hz] |
| Information packet length = 100 [FEC input bits] |
| FEC coding rate (r) = 0.33 |
| Physical layer packet length = 312 [FEC encoded symbols] |
| Modulation order (M) = 2 |
| Spreading factor ($L_w$) = 256 |
| Chip rate = 3.84 [Mcps] |
| GTW packet $[E_b/N_0]_{nom}$ = 13.70 [dB] |
| GTW packet $[E_c/N_0]_{nom}$ = −15.15 [dB] |
| where $\left[\frac{E_c}{N_0}\right]_{nom} = \frac{r}{\log_2(M)L_w}\left[\frac{E_b}{N_0}\right]_{nom}$ |
| Power error model = Uniform (Lognormal for comparison) |
| RTN link max power deviation = 3.0 [dB] |
| Number of IC iterations = 5 |
| Window size = 936 [symbols] |
| Window shift = 156 [symbols] |

Another set of simulations has been performed using the following configuration for the E-SSA simulator (ideal cancellation):

TABLE 3

| |
|---|
| Simulation duration = 93600 [symbols] |
| Normalized MAC load G = variable [b/s/Hz] |
| Information packet length = 100 [FEC input bits] |
| FEC coding rate = 0.32 |
| Physical layer packet length = 312 [FEC encoded symbols] |
| Modulation order = 2 |
| Spreading factor = 256 |
| GTW packet $[E_b/N_0]_{nom}$ = 13.70 [dB] |
| GTW packet $[E_c/N_0]_{nom}$ = −15.15 [dB] |
| Power error model = Uniform (Lognormal for comparison) |
| RTN (return) link max power deviation = 7.0 [dB] |
| RTN link min power deviation = −9.8 [dB] |
| Number of IC iterations = 5 |
| Window size = 936 [symbols] |
| Window shift = 156 [symbols] |

Figure 10A:
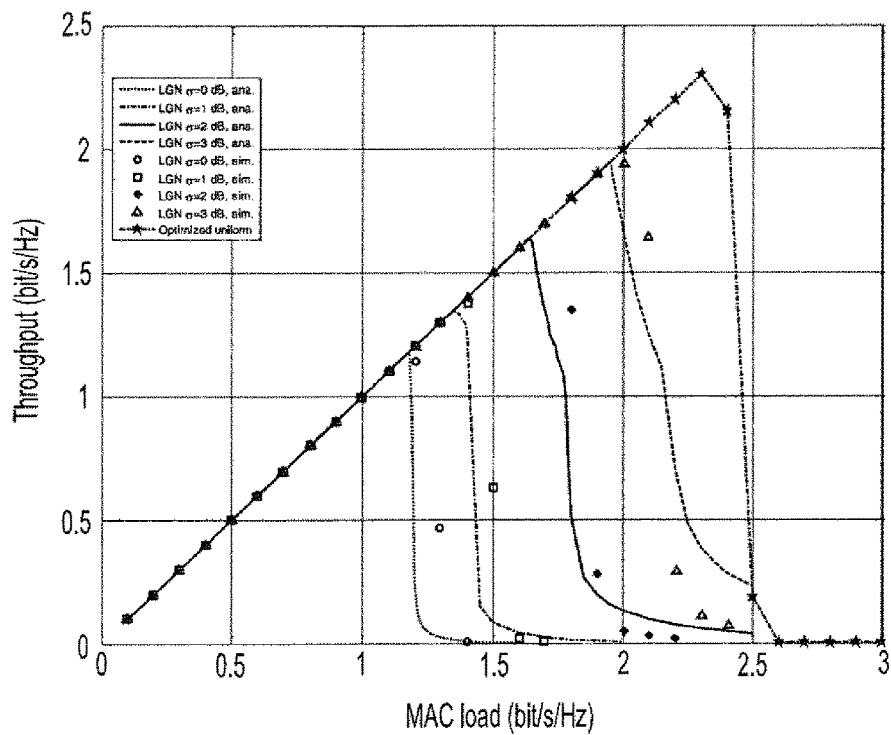
Figure 10B:
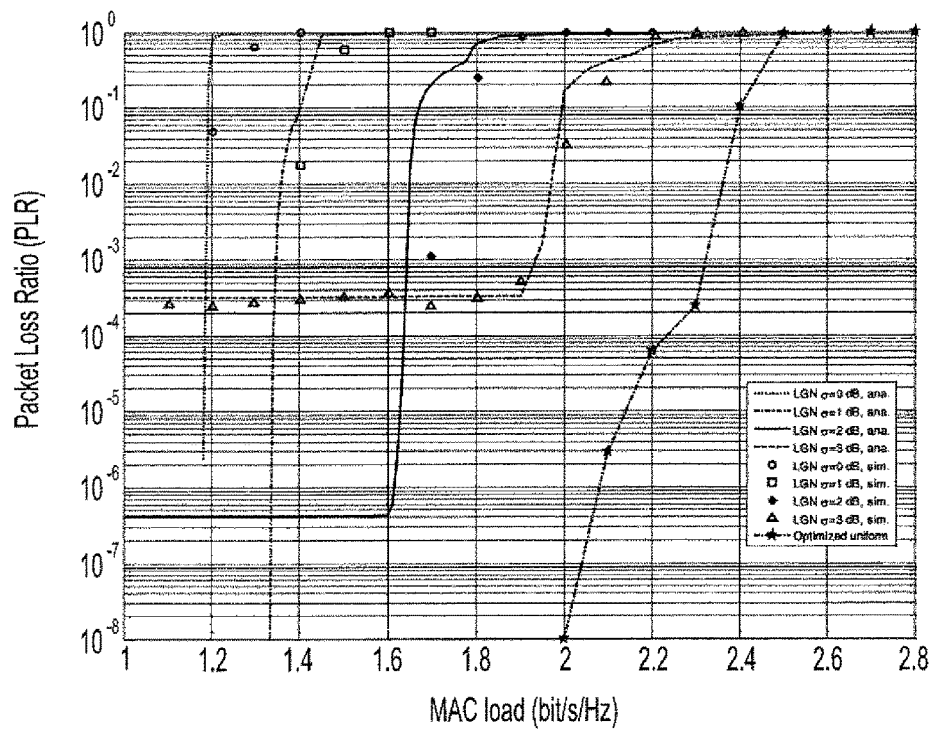

The simulation results are reproduced in FIGS. 10A and 10B where simulated throughput and PLR as functions of the MAC load have been compared to previous results obtained with different log normal (LGN) distributions (on the figures captions: "ana" means analytics and "sim" means simulations). The 20% performance advantage of the uniform power distribution versus log normal one is evident although the parameters were not fully optimized for the specific system parameters.

A third example of the power distribution optimization has been studied for a configuration corresponding to a more realistic FEC block size of 1200 information bits. In this case the inventive optimization method provides the results reported in table 4. Three different assumptions for the SIC residual power β has been used (Case 1 β=−∞ dB, Case 2 β=−21 dB, Case β=−20 dB).

TABLE 4

| Parameter | Case 1 | Case 2 | Case 3 |
|---|---|---|---|
| FEC frame info bits size | 1200 | 1200 | 1200 |
| SIC residual β[dB] | −∞ | −21 | −20 |
| FEC $E_b/N_0$ threshold [dB] | 1.1 | 1.1 | 1.1 |
| SIC $E_b/N_0$ threshold [dB] | 0.3 | 0.3 | 0.3 |
| Selected αmax | 7 | 7 | 7 |
| Optimized αmin | −11.8 | −10.0 | −9.6 |
| FEC margin [dB] | 0.80 | 0.32 | 0.24 |
| SIC margin [dB] | 1.24 | 0.84 | 0.81 |

Figure 11A:
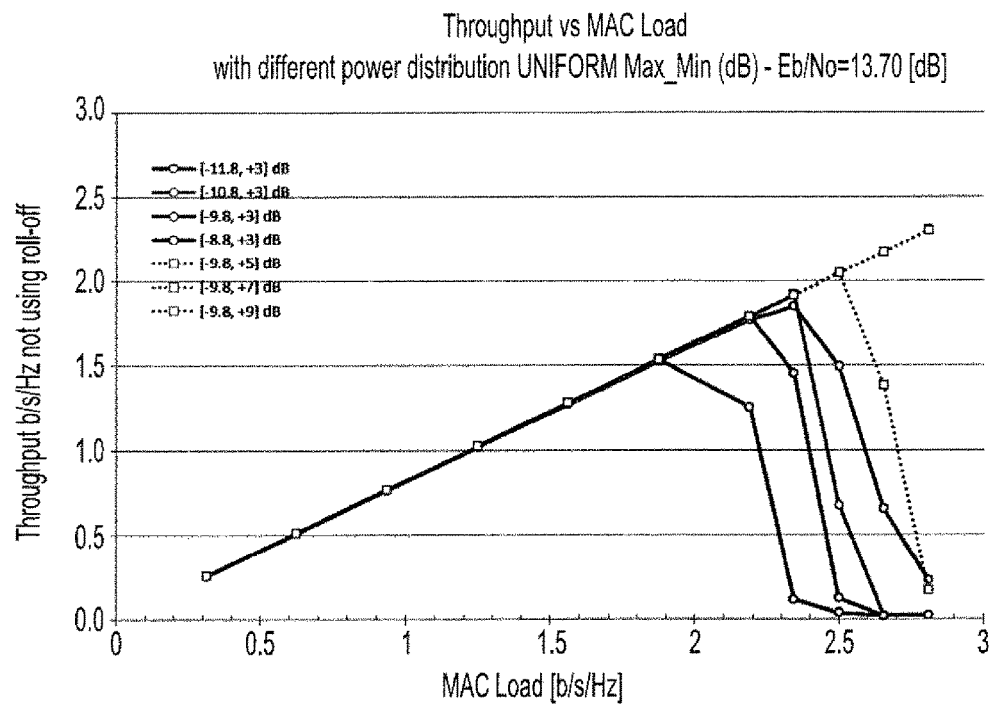
FIGS. 11A and 11B, plots illustrating the technical results of the invention, based on laboratory measurements.
Figure 11B:
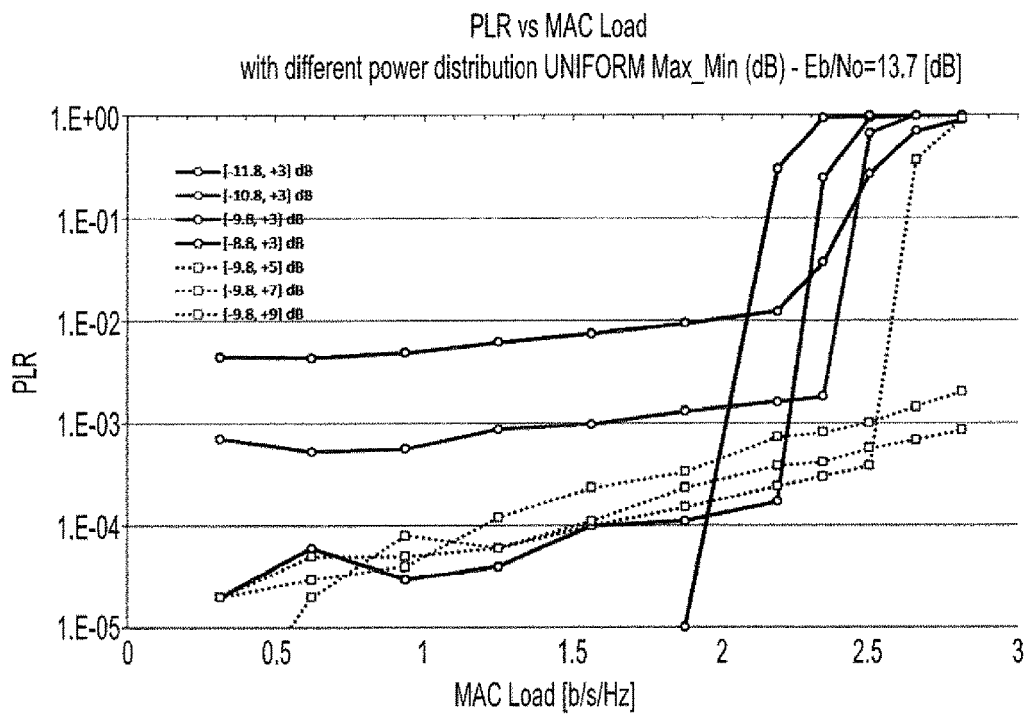

The semi-analytical power distribution optimized results have been experimentally verified using an E-SSA hardware prototype. The measured results are reported in FIGS. 11A and 11B, with conversion between the number of packets/s and the MAC load in b/s/Hz reported in table 5. It is apparent that the optimum performance are obtained for $\alpha_{min} = -9.8$ dB which corresponds according to Table 4 to a residual SIC interference factor β of about −20.5. This value is close to the experimental measurement for the S-MIM prototype of β=−21 dB (for low SNR). So it can be concluded that there is a good match between the analytical optimization and the experimental findings.

TABLE 5

| MAC load Pk/s | MAC Load with roll-off [b/s/Hz] | MAC Load w/o roll-off [b/s/Hz] |
|---|---|---|
| 1000 | 0.26 | 0.31 |
| 2000 | 0.51 | 0.63 |
| 3000 | 0.77 | 0.94 |
| 4000 | 1.02 | 1.25 |
| 5000 | 1.28 | 1.56 |
| 6000 | 1.54 | 1.88 |
| 7000 | 1.79 | 2.19 |
| 7500 | 1.92 | 2.34 |
| 8000 | 2.05 | 2.50 |
| 8500 | 2.18 | 2.66 |
| 9000 | 2.31 | 2.81 |

It is remarkable that the best performances are obtained using a uniform power randomization range of [−9.8, +7] dB. These performances correspond to a throughput of 2.8 b/s/Hz if the Square-Root Raised-Cosine (SRRC) filter excess bandwidth due to the roll-off factor is neglected; otherwise throughput is reduced to 2.3 b/s/Hz for a SRRC roll-off factor of 0.2. Reducing the packet power fluctuation dynamic range to [−9.8, +5] dB the throughput is reduced to 2.5 b/s/Hz. Further limiting the power dynamic range to [−9.8, +3] dB the throughput is further reduced to 2.2 b/s/Hz which is in line with the results obtained before by simulation with a 100 bits FEC block size but ideal E-SSA processing. Clearly the results also depend on the assumed value of $$\left[\frac{E_s}{N_0}\right]_{nom}$$

(which has been assumed to be 13.7 dB) but it is clearly system dependent. According to the reference Ka-band satellite system link budgets in the average case link budget the user gets a $$\left[\frac{E_s}{N_0}\right]_{nom} = 16.6 \text{ dB}$$

which is almost 3 dB higher than the value assumed for the previous MAC performance assessment. The best $$\left[\frac{E_s}{N_0}\right]_{nom}$$

is probably about 20.6 dB but just in a negligible amount of locations. Thus assuming that $$\left[\frac{E_s}{N_0}\right]_{nom} = 13.7 \text{ dB},$$

The distance from the capacity bounds for several E-SSA configurations are summarized in table 6 The MAC load assumes that there is no extra bandwidth due to the SRRC roll-off factor.

It is clear that the loss depends on the system parameters but also on the presence or absence of perfect interference cancellation. The E-SSA capacity loss with respect to the bound ranges from 0.2 to 13% in case of perfect IC and from 16 to 22% in case of residual IC factor β=−20 dB. The loss is minimised when $\alpha_{max}$ is extended to 7 dB corresponding to a maximum packet $E_b/N_0$=20.7 dB. Instead the loss with respect to the capacity bounds amounts to 13% when the maximum terminal power is reduced to $E_b/N_0$=11 dB. These results seem to confirm that the E-SSA with the proposed optimized power distribution can achieve the channel maximum theoretical capacity when the power randomization range is large enough with a practically realizable asynchronous and uncoordinated random access system exploiting a i-SIC multi-user packet detector at the gateway.

TABLE 6

| FEC frame info bits size [bits] | SF | SIC residual β [dB] | Selected $\alpha_{max}$ [dB] | Optimized $\alpha_{min}$ [dB] | $[E_b/N_0]_{nom}$ [dB] | $[E_b/N_0]_{sys}$ [dB] | Capacity Bound [b/s/Hz] | $G_{max}$ [b/s/Hz] | E-SSA Loss vs bound (%) |
|---|---|---|---|---|---|---|---|---|---|
| 1200 | 256 | −∞ | 7 | −12.30 | 13.7 | 14.11 | 3.81 | 3.8 | 0.2 |
| 1200 | 256 | −20 | 7 | −9.3 | 13.7 | 14.74 | 3.94 | 3.3 | 16 |
| 1200 | 256 | −∞ | 6 | −12.4 | 13.7 | 13.37 | 3.66 | 3.65 | 0.1 |
| 1200 | 256 | −20 | 6 | −9.7 | 13.7 | 13.86 | 3.76 | 3.1 | 18 |
| 1200 | 256 | −∞ | 2 | −12.4 | 13.7 | 10.33 | 3.02 | 2.95 | 2.5 |
| 1200 | 256 | −20 | 2 | −12.4 | 13.7 | 10.65 | 3.09 | 2.6 | 16 |
| 1200 | 256 | −∞ | 6 | −7.6 | 9.0 | 9.75 | 2.9 | 2.7 | 7 |
| 1200 | 256 | −20 | 6 | −6.1 | 9.0 | 10.03 | 2.96 | 2.4 | 19 |
| 1200 | 256 | −∞ | 2 | −7.7 | 9.0 | 7.02 | 2.32 | 2.0 | 13 |
| 1200 | 256 | −20 | 2 | −7.7 | 9.0 | 7.14 | 2.32 | 1.8 | 22 |

$\alpha_{max}$=3 dB is certainly obtained. Therefore an effective throughput of 1.9 b/s/Hz (including the SRRC roll-off factor) is potentially achievable in the existing reference Ka-band satellite type of system.

It is also interesting to understand how the performance which can be obtained by the optimized E-SSA power distribution compares to the CDMA with random spreading capacity bounds—see S. Verdu and S. Shamai, "Spectral efficiency of CDMA with random spreading|", IEEE Transact. On Information Theory, vol. 45, pp. 622-640, March 1999.

First, the system received energy-per-bit is computed as $$\left[\frac{E_b}{N_0}\right]_{sys} = \left[\frac{E_b}{N_0}\right]_{nom} E_{k,l}\{\overline{\alpha}(k, l)\},$$

(see Hou, J. E. Smee, H. D. Pfister and S. Tomasini, "Implementing Interference Cancellation to Increase the EV-DO Rev. A Reverse Link Capacity", IEEE Comm. Magazine, February 2006, pp. 96-102), where $\overline{\alpha}$ is the optimized incoming packet power distribution.

Figure 12:
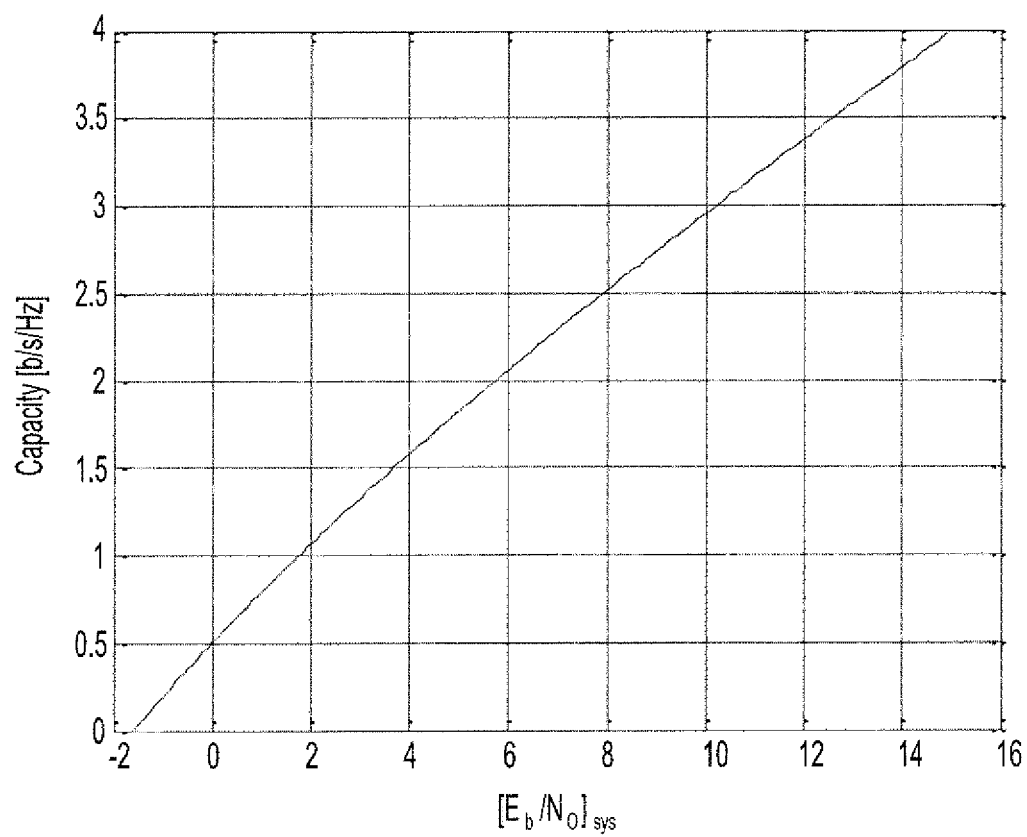
FIG. 12 a plot of the capacity bound for CDMA with random spreading sequences.

The capacity bound can be determined using the following equation from the above-referenced papers:

$$\left[\frac{E_b}{N_0}\right]_{sys} = \frac{2^{2C} - 1}{2C},$$

where C is the multiple access channel capacity expressed in b/s/Hz. The results of eqn. (5-2) are reported in FIG. 12.

Figure 14:
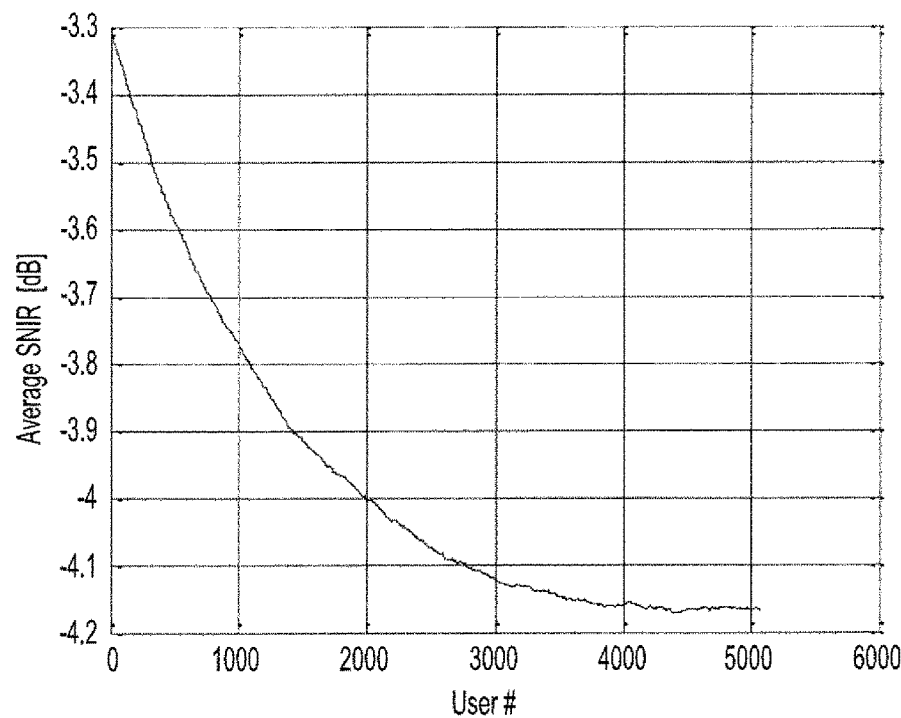
FIGS. 14 and 15, two plots illustrating the user power distribution in a communication system according to said first embodiment of the invention for two different values of the channel load.

Finally it is remarked that, when applying the E-SSA packets random power range optimization algorithm described by eqn. (5) for maximum load conditions (G=3.3 b/s/Hz in the specific case), the SNIR follows a monotonic behaviour starting from the lowest SNIR condition at the beginning of the i-SIC process approximately corresponding to $$\left[\frac{E_s}{N_0}\right]_{min}^{SIC} = -3.4 \text{ dB}$$

and reaches $$\left[\frac{E_s}{N_0}\right]_{min}^{FEC} = -4.2 \text{ dB}$$

as final value (last packet to be detected after all the others have been removed). This behaviour is clearly visible in the plot of FIG. 14, corresponding to the second case of the Table 6.

Figure 8A:
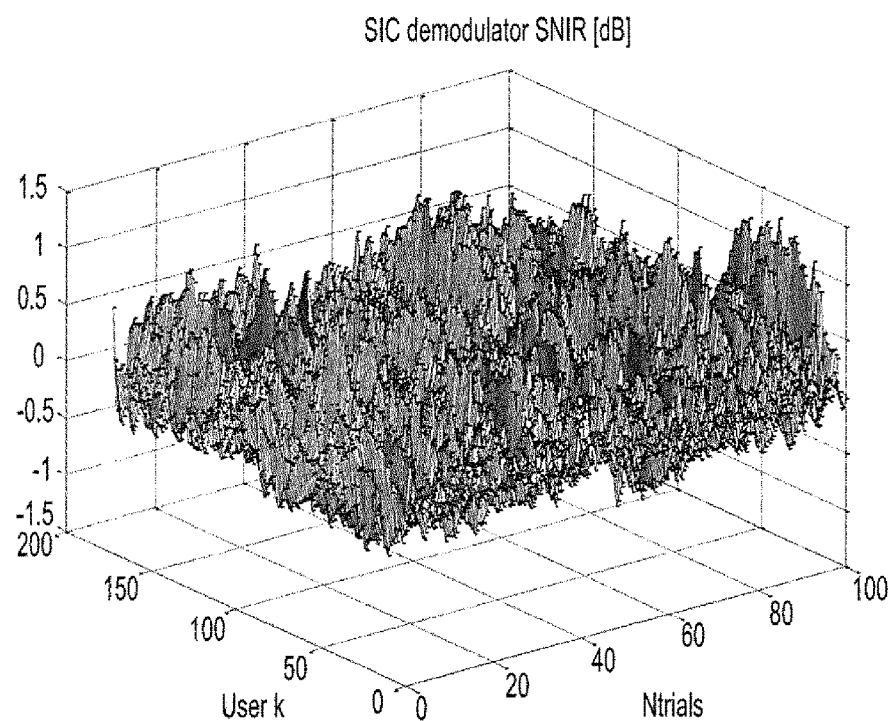
FIGS. 8A and 8B, two plots illustrating the user power distribution in a communication system according to a second exemplary embodiment of the invention.
Figure 8B:
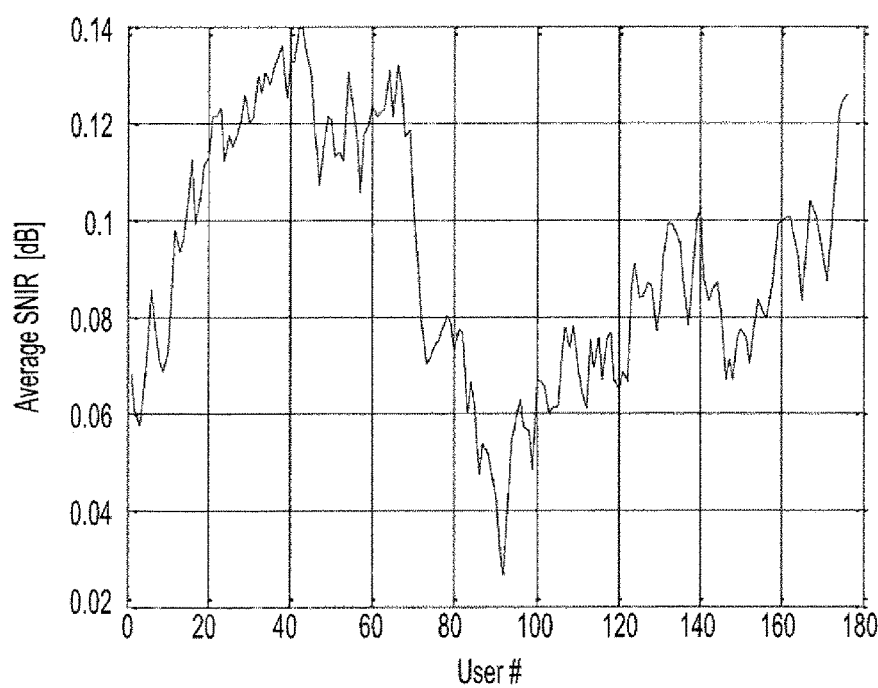
Figure 15:
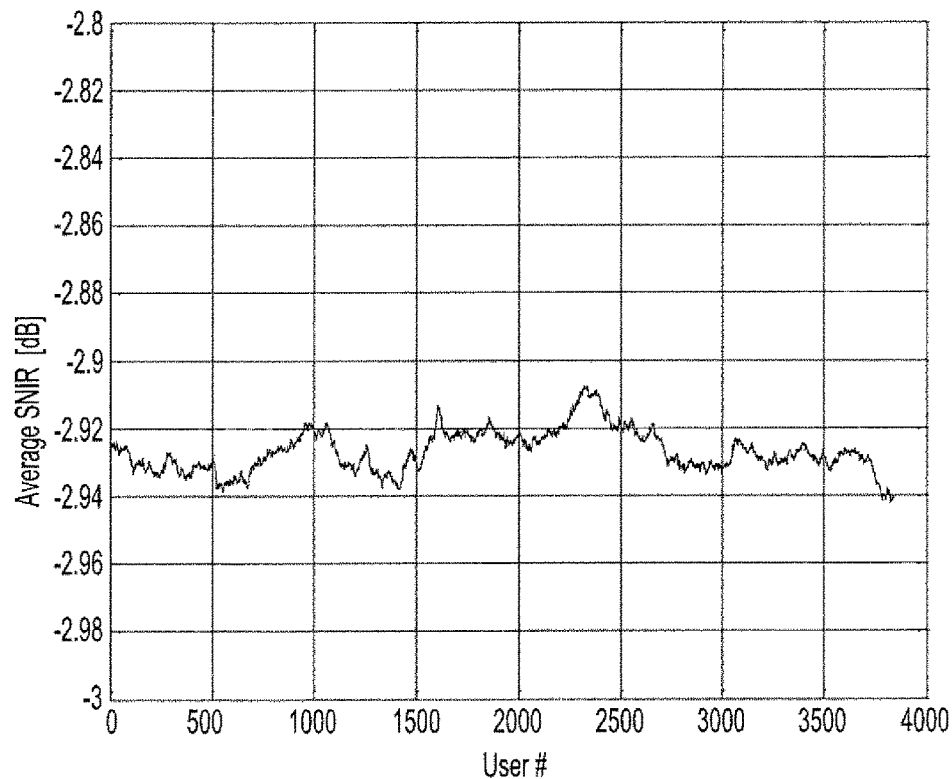

Instead, when the loading is not too close to the limits as it was the case reported in FIGS. 7 and 8 once the power distribution has been optimised, the SNIR evolution is much more flat as it is apparent from FIG. 15 corresponding to also to the second case of Table 6 but when the load is reduced to G=2.5 b/s/Hz.

In a variant, an optimization process exploits a semi-analytical methodology described hereafter in a section B and comprises a set of steps executed subsequently.

In a first step, a parameter to be optimized according to the type of distribution is selected. For example, the chosen parameter is the standard deviation for a log normal distribution or the dynamic range for a uniform distribution. Then, in a second step several parameters are defined. These parameters are:
  the distribution profile (for example a Log-normal distribution),
  $E_b/N_0$ terminal (extracted from the link budget),
  target PLR (for example $10^{-3}$),
  maximum number of SIC iterations (for example 10),
  β value of residual power after SIC (for example 0.01).

Then, in a third step the semi analytic process as described in section B will take these parameters as input and will be executed to output a range of possible values for the main parameter to be optimized. This range is dependant from the MAC load.

Then, in a fourth step the optimization is carried out through the minimization or maximization of a performance a parameter. The optimization is carried out for example through the maximization of the channel throughput subject to at least transmit power level constraints, or trough the minimization of the different in signal to noise plus interference ratio (SNIR) between data packets within successive interference cancellation.

An improved derivation of the optimum incoming packets power distribution for E-SSA exploiting two improved different models for the E-SSA demodulator, as variants of the models described by the equations (1) to (5)-b, can be carried out. The first improved model is a simplified approach allowing approximate yet closed-form expression of the optimized power distribution. The second improved model is a more accurate recursive semi-analytic E-SSA model allowing to optimize the capacity performance. The improved derivation of the optimum incoming packets power distribution and the improved models for the E-SSA demodulator are presented here below.

The notations used for this derivation will be described along the description here below that should be considered as self content.

Let the Random Access (RA) system of the invention be modelled as a system whereby at a given instant there are K colliding packets each characterized by a received power $P_k$. In line with the E-SSA algorithm, it is assumed that the RA burst demodulator is ranking the K packets present in the demodulator window memory so that $\{P_1 \leq P_2 P_{K-1} \leq P_K\}$. Recalling that $\gamma_k = P_k/(N_0 R_s)$ we introduce the Signal-to-Noise plus Interference (SNIR) ratio $\rho_k = P_k/[(N_0+I_0)R_s]$ where $I_0$ represent the Multiple Access Interference (MAI) equivalent Power Spectral Density (PSD). The goodness of the MAI approximation with an equivalent White Gaussian Noise process is well known from the art. Due to the asynchronous RA nature each interfering packet will have a partial overlap with the packet of interest. The normalized overlap factor between packets i and j is characterized with a random variable α(i,j) uniformly distributed in the interval [0, 1]. According to our definition α(i,j)=1 means that there is full time overlap between the packet of interest and the interfering packet. By definition α(i,i)=0 as a packet is not interfering with itself.

A. Simplified Iterative Modelling

A detailed description of the E-SSA I-SIC burst demodulator processing is reported in the already cited paper from O. Del Rio Herrero et al. entitled "High Efficiency Satellite Multiple Access Scheme for Machine-to-Machine Communications". In a nutshell, the E-SSA demodular is storing the incoming baseband samples in a digital memory spanning a W packets window size not necessarily being an integer number. Once the window memory is full a preamble searcher is activated scanning the memory samples left to right to identify possible detectable packets. Every time a packet preamble is detected, then burst demodulation of the payload is attempted. If the packet payload Cyclic Redundancy Check (CRC) is successful, then the payload data is exploited to locally regenerate the packet at baseband level and correlated with the detected packet memory samples to get a refined packet amplitude and phase estimate. Using this refined channel estimation, the regenerated packet is subtracted from memory (Interference Cancellation step) and the preamble scan continues until the end of the window is reached. At this point, the process is repeated from the window beginning $N_{iter}$ times until all the detectable packets are removed. When the I-SIC process on the current memory window is completed, a fraction of the oldest memory samples is removed and the remaining samples are shifted to the left and new memory samples added (sliding window process). The complete I-SIC process on the memory window is started again and so forth. It is clear that when starting an I-SIC overall cycle on the current sliding window samples, only a subset of packets will be detectable, most likely the ones experiencing the highest SNIR. But as soon as some packets are detected and cancelled from memory, others will become detectable. The interest to repeat $N_{iter}$ times the memory scanning prior sliding the memory window, is mainly related to the asynchronous interference. Removing some detected packets may have positive effect on the detectability of the past ones thus the need to iterate back in the memory. Considering the iterative nature of the process and the presence of the sliding memory window allowing to demodulate each packet into different demodulation windows, it is clear that E-SSA demodulator SNIR threshold is different from a conventional SIC demodulators whereby at each SIC demodulation step the final target Packet Loss Rate (PLR typically equal to $10^{-3}$ or lower) shall be achieved. Instead for E-SSA a relatively high PLR value is sufficient to start the memory "cleaning-up" process and achieve I-SIC convergence i.e reaching a very low PLR at the end of the iterative process. For the E-SSA demodulation, as there are many colliding packets in the same demodulation window, even with an initial PLR higher than the target value, a non negligible amount of packets will be detected and canceled at each iteration. Then, assuming there is a sufficient number of iterations, E-SSA PLR will converge to the target value.

Based on the above discussion, following the packet ranking according to their power described above (j=1 corresponds to the lowest power packet), the E-SSA I-SIC convergence condition can be described as:

$$\rho_j \geq \begin{cases} \left[\frac{E_s}{N_t}\right]_{FEC} & \text{if } j = 1 \\ \left[\frac{E_s}{N_t}\right]_{1-SIC}(j) & \text{if } j \neq 1, \end{cases} \quad (12)$$

where $$\left[\frac{E_s}{N_t}\right]_{FEC}$$

represents the required FEC code SNR to achieve the target PLR value and $$\left[\frac{E_s}{N_t}\right]_{I\text{-}SIC}(j)$$

represents the minimum SNIR for which the E-SSA iterative SIC process is converging at step j. In general $$\left[\frac{E_s}{N_t}\right]_{I\text{-}SIC}(j)$$

is dependent on the current I-SIC step j as there are less and less packets remaining during the I-SIC process. Consequently, it is expected that $$\left[\frac{E_s}{N_t}\right]_{I\text{-}SIC}(j)$$

will increase with j asymptotically approaching the value $$\left[\frac{E_s}{N_t}\right]_{FEC}.$$

To progress in the E-SSA I-SIC analytical modelling, we assume that $$\left[\frac{E_s}{N_t}\right]_{I\text{-}SIC}(j) = \left[\frac{E_s}{N_t}\right]_{I\text{-}SIC} \forall j.$$

This means that the I-SIC SNIR convergence threshold is the same for all the I-SIC steps. Experimentally it has been found that a PLR of 0.9 after the first SIC iteration is typically sufficient to achieve I-SIC convergence. Furthermore we assume that the eqn. (12) inequalities are satisfied as equalities. By doing so the E-SSA convergence condition given by eqn. (12) becomes:

$$\rho_j = \begin{cases} \left[\frac{E_s}{N_t}\right]_{FEC} & \text{if } j = 1 \\ \left[\frac{E_s}{N_t}\right]_{I\text{-}SIC} & \text{if } j \neq 1 \end{cases}, \quad (13)$$

where $$\left[\frac{E_s}{N_t}\right]_{I\text{-}SIC}$$

corresponds to the SNIR for which PLR is 0.9 as discussed before. The validity of this approximation will be validated at the end of this section.

Following the E-SSA iterative detector analysis reported in the cited paper from O. Del Rio Herrero et al., the SNIR for the packet j can be expressed as:

$$\rho_j = \frac{\gamma_j}{1 + \frac{1}{L_w}\left[\sum_{i=1}^{j-1}\alpha(i,j)\gamma_i + \beta\sum_{i=j+1}^{K}\alpha(i,j)\gamma_i\right]}, \quad (14)$$

where $0 \leq \beta \leq 1$ represents the normalized residual IC power factor; $\beta=0$ corresponds to the ideal IC while $\beta=1$ implies no IC. By replacing eqn. (14) in (13) one gets a linear system in K equations and K unknown that can be numerically solved to find the optimum E-SSA SNR packet power distribution $\gamma_i$:

$$\begin{cases} \gamma_1 = \left[\frac{E_s}{N_t}\right]_{FEC}\left[1 + \frac{\beta}{L_w}\sum_{i=1}^{K}\alpha(i,1)\gamma_i\right] \\ \gamma_2 = \left[\frac{E_s}{N_t}\right]_{I\text{-}SIC}\left[1 + \frac{(1-\beta)}{L_w}\alpha(1,2)\gamma_1 + \frac{\beta}{L_w}\sum_{i=1}^{K}\alpha(i,2)\gamma_i\right] \\ \vdots \\ \gamma_K = \left[\frac{E_s}{N_t}\right]_{I\text{-}SIC}\left[1 + \frac{1}{L_w}\sum_{i=1}^{K}\alpha(i,K)\gamma_i\right] \end{cases}. \quad (15)$$

The solution of the above linear system of equations is conditioned to the actual realization of the packet overlap factors $\alpha(i,j)$ for the current packet of interest. Assuming that the $\alpha(i,j)$ variables are known, an exact calculation of $\gamma_j$ is possible. However, this is not feasible in a practical system as $\alpha(i,j)$ are time variant and a priori unknown. To avoid a time variant linear system coefficients we will be replacing $\alpha(i,j)$ by its average value i.e. $\alpha(i,j) \cong E\{\alpha(i,j)\}=0.5$. The accuracy of this approximation will be investigated later in this section. By introducing the auxiliary variable Y defined as:

$$\Upsilon = 1 + \frac{\beta}{2L_w}\sum_{i=1}^{K}\gamma_i, \quad (16)$$

then eqn. (7) becomes:

$$\begin{cases} \gamma_1 = \left[\frac{E_s}{N_t}\right]_{FEC}\Upsilon \\ \gamma_2 = \left[\frac{E_s}{N_t}\right]_{I\text{-}SIC}\left[\Upsilon + \frac{(1-\beta)}{2L_w}\gamma_1\right] \\ \vdots \\ \gamma_K = \left[\frac{E_s}{N_t}\right]_{I\text{-}SIC}\left[\Upsilon + \frac{(1-\beta)}{2L_w}\sum_{i=1}^{K}\gamma_i\right] \end{cases}. \quad (17)$$

From (17) one can get the following recursive expression for the individual packets SNR:

$$\gamma_j = \left[\frac{E_s}{N_t}\right]_{I\text{-}SIC}\Upsilon\left\{1 + \frac{(1-\beta)}{2L_w}\left[\frac{E_s}{N_t}\right]_{FEC}\right\}\left\{1 + \frac{(1-\beta)}{2L_w}\left[\frac{E_s}{N_t}\right]_{I\text{-}SIC}\right\}^{j-2}, \quad (18)$$

for $j > 1$.

Looking at (18) it is apparent that with the approximation made before the optimum incoming packets power profile is exponential (thus uniform in dB) also for the case of uncoordinated users. This is a similar result to the one found by Viterbi although with a different assumption on the demodulator structure (continuous with SIC instead of bursty with I-SIC for E-SSA). According to this model the optimum packet power distribution shall be uniformly distributed in dB between $$\log_{10}\left[\frac{E_s}{N_t}\right]_{min} \text{ and } \log_{10}\left[\frac{E_s}{N_0}\right]_{max}$$

so that following (18) we get:

$$\left[\frac{E_s}{N_0}\right]_{min} = \left[\frac{E_s}{N_t}\right]_{I-SIC}\Upsilon\left\{1+\frac{(1-\beta)}{2L_w}\left[\frac{E_s}{N_t}\right]_{FEC}\right\} \cong \left[\frac{E_s}{N_t}\right]_{I-SIC}\Upsilon, \quad (19)$$

$$\left[\frac{E_s}{E_0}\right]_{max} = \left[\frac{E_s}{N_t}\right]_{min}\left\{1+\frac{(1-\beta)}{2L_w}\left[\frac{E_s}{N_t}\right]_{FEC}\right\}\left\{1+\frac{(1-\beta)}{2L_w}\left[\frac{E_s}{N_t}\right]_{I-SIC}\right\}^{K-2}.$$

Where in the first term of (19) we assumed $$\frac{(1-\beta)}{2L_w}\left[\frac{E_s}{N_t}\right]_{FEC} \ll 1.$$

Figure 16:
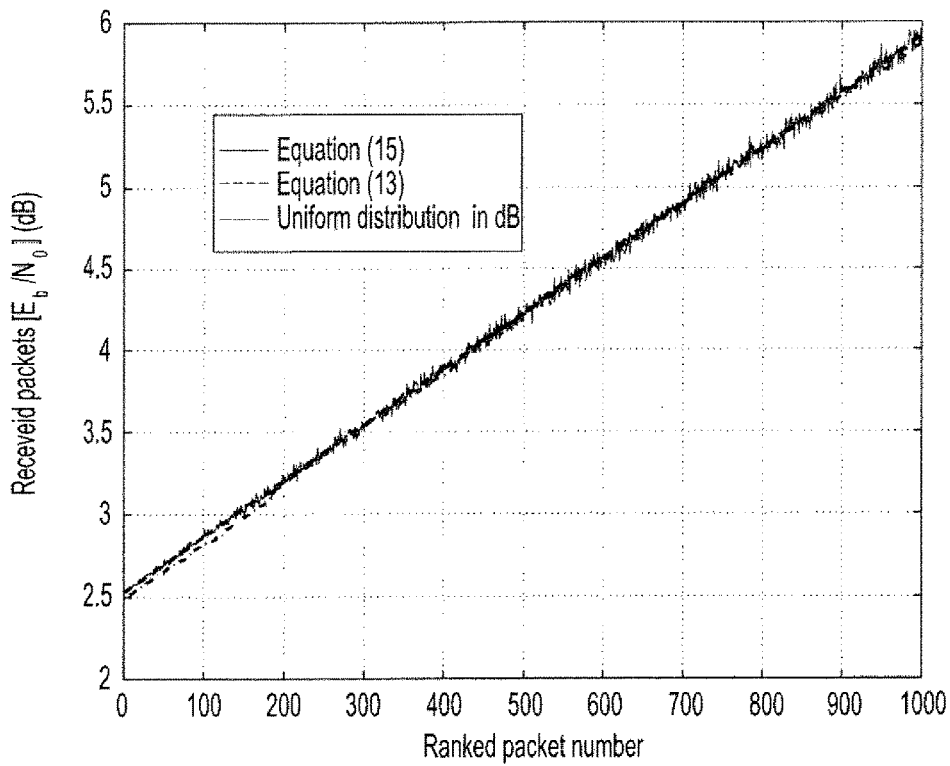
FIGS. 16 and 17, plots of different incoming packets E-SSA demodulator power calculated distributions for $L_w=256$ and $L_w=16$ with $\beta=0.05$, $[E_s/N_t]_{FEC}=2$ dB, $[E_s/N_t]_{I-SIC}=1$ dB.
Figure 17:
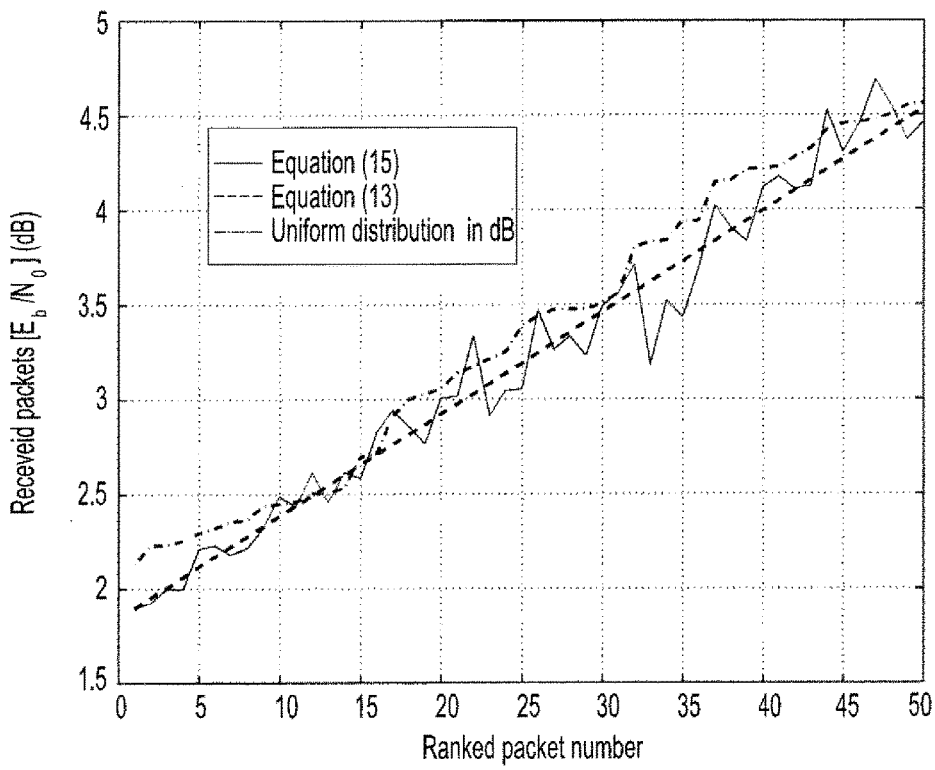

FIGS. 16 and 17 show the E-SSA demodulator incoming packets optimum power distribution using the exact system of eqn. (15) (straight line), the recursive eqn. (18) (dashed line) and the one obtained by randomly generating the incoming packets power according to a uniform in dB distribution (dashed-dot line) in the range $$\left[\left[\frac{E_s}{N_0}\right]_{min},\left[\frac{E_s}{N_0}\right]_{max}\right].$$

We can conclude that the described approach, using random independent generation of packets, closely approximates the optimum power distribution with the advantage of not requiring any real-time coordination among terminals for setting the transmit power. The larger the number of simultaneous packets received is, the higher is the accuracy of approximating the overlap factors α(i,j) with their average value. As the number of simultaneous packets supported is proportional to the spreading factor, the accuracy of the approximated model depends on the spreading factor. For instance, for $L_w$=256 the standard deviation for difference between optimum power distribution provided by eqn. (13) and eqn. (14) has been found to be 0.05 dB. Reducing the spreading factor to $L_w$=8 the standard deviation of the difference grows to 0.3 dB. This type of error causes fluctuations on PLR values which can prevent the I-SIC process to converge. At E-SSA maximum capacity the probability of I-SIC not convergence is negligible for an packet power distribution error standard deviation less than 0.1 dB. If larger than that as it may be the case for high load conditions with small spreading factor (e.g. $L_w$=16) operations too close to the maximum E-SSA capacity limits shall be avoided.

The most critical system parameter in eqn. (19) is certainly the I-SIC demodulator threshold $$\left[\frac{E_s}{N_t}\right]_{I-SIC}$$

which is implementation dependent and not easy to be accurately determined being also dependent on the current E-SSA demodulator step. The risk is that by using $$\left[\frac{E_s}{N_0}\right]_{min} = \left[\frac{E_s}{N_t}\right]_{I-SIC}\Upsilon$$

as indicated by eqn. (19) in certain cases the required target PLR may not achieved due to the I-SIC process randomness. To be on the safe side one can assume a more conservative value for $$\left[\frac{E_s}{N_0}\right]_{min} \text{ i.e. } \left[\frac{E_s}{N_0}\right]_{min} = \left[\frac{E_s}{N_0}\right]_{I-SIC}\Upsilon \approx \left[\frac{E_s}{N_t}\right]_{FEC}\Upsilon$$

so that eqn. (19) simplifies to:

$$\begin{cases}\left[\frac{E_s}{N_0}\right]_{min} \cong \left[\frac{E_s}{N_t}\right]_{FEC}\Upsilon \\ \left[\frac{E_s}{N_0}\right]_{max} = \left[\frac{E_s}{N_0}\right]_{min}\left\{1+\frac{(1-\beta)}{2L_w}\left[\frac{E_s}{N_t}\right]_{FEC}\right\}\left\{1+\frac{(1-\beta)}{2L_w}\left[\frac{E_s}{N_t}\right]_{I-SIC}\right\}^{K-2}.\end{cases} \quad (20)$$

The calculation of the term Y is still following eqn. (16) but being the packet power distribution uniform in dB in the range $$\left[\log_{10}\left[\frac{E_s}{N_0}\right]_{min},\log_{10}\left[\frac{E_s}{N_0}\right]_{max}\right]$$

exploiting the properties of geometric series one gets:

$$\sum_{i=1}^{K}\gamma_i \triangleq \Psi\left(\left[\frac{E_s}{N_0}\right]_{min},\left[\frac{E_s}{N_0}\right]_{max}\right) = \quad (21)$$

$$\frac{\left\{1+\frac{(1-\beta)}{2L_w}\left[\frac{\left[\frac{E_s}{N_0}\right]_{max}-\left[\frac{E_s}{N_0}\right]_{min}}{K-1}\right]\right\}^{K-1}-1}{\frac{(1-\beta)}{2L_w}\left[\frac{\left[\frac{E_s}{N_0}\right]_{max}-\left[\frac{E_s}{N_0}\right]_{min}}{K-1}\right]}.$$

By using eqn. (21) the optimum packet power distribution range can be derived by solving the following 3 by 3 nonlinear system of equations:

$$\begin{cases} \left[\dfrac{E_s}{N_0}\right]_{min} \cong \left[\dfrac{E_s}{N_t}\right]_{FEC} \Upsilon \\ \left[\dfrac{E_s}{N_0}\right]_{max} = \left[\dfrac{E_s}{N_0}\right]_{min} \left\{\dfrac{1+\dfrac{(1-\beta)}{2L_w}\left[\dfrac{E_s}{N_t}\right]_{FEC}}{\dfrac{(1-\beta)}{2L_w}\left[\dfrac{E_s}{N_t}\right]_{I-SIC}}\right\}^{K-2} \\ \Upsilon = 1 + \dfrac{\beta}{2L_w}\Psi\left(\left[\dfrac{E_s}{N_0}\right]_{min},\left[\dfrac{E_s}{N_0}\right]_{max}\right) \end{cases} \quad (22)$$

It should be remarked that for large values of β the system of equation (22) may not have solution; this is the case for K=1000 and β≥0.5. The simplified analytical model developed in this section has shown that for E-SSA the incoming packets uniform power distribution in dB is very close to the optimal one. However, this simplified model can not provide accurate results in terms of E-SSA capacity for given target PLR. The current model weakness will be overcome in the next section where the E-SSA capacity results obtained using the optimized packet range given by eqn. (22) will be compared to simulation findings and analytical results obtained thanks to a more accurate recursive semi-analytical E-SSA modelling.

B. Enhanced Iterative SIC Modelling

In this section a more accurate modelling of the E-SSA I-SIC process is derived that takes into account the packet detection error probability and avoids the use of the parameter $$\left[\dfrac{E_s}{N_t}\right]_{I-SIC}$$

which, as discussed before, it is not easy to derive. The enhanced modelling can be obtained modifying eqn. (14) to include the impact of the packet i probability of detection in the SNIR calculation at step n of the iterative E-SSA detector through the variable σ(i,n) detailed in the equation below. Analytically the enhanced I-SIC detector SNIR for the j-th packet at iteration n, $\rho_j(n)$ can be expressed as:

$$\rho_j(n) = \dfrac{\gamma_j}{1 + \dfrac{1}{2L_w}\left[\sum_{i=1}^{j-1} \sigma(i,n)\gamma_i + \sum_{i=j+1}^{K} \sigma(i,n-1)\gamma_i\right]} \quad (23)$$

$$\sigma(i,n) \triangleq \beta\{1 - \Phi[\rho_i(n)]\} + \Phi[\rho_i(n)],$$

where Φ[•] represents the physical layer PLR as a function of the current packet SNIR. The first term in the denominator of eqn. (23) refers to the interference contribution for lower SNIR packets than the current packet j. The second term in eqn. (23) corresponds to the interference contribution by the packets with higher SNIR than packet j. Differently from eqn. (14), in eqn. (23) the impact of the PLR is accounted for by means of the term σ(i,n). In the expression of σ(i,n) the first term provides an estimation of the average normalized interference contribution taking into account the probability of the i-th packet being detected and cancelled at iteration n. The second term instead represents the average normalized interference contribution for the i-th packet not being detected and cancelled at iteration n. Equation (23) reduces to (14) under the assumption that for i<j Φ[$\rho_i(n)$]≅1 thus σ(i,n)≅1 and that for i>j Φ($\rho_i(n)$)≅0, thus σ(i,n)≅β.

Eqn. (23) can be iteratively computed, starting from n=1 and j=1, for n=1, 2, ... $N_{iter}^{max}$, where $N_{iter}^{max}$ represents the maximum allowed number of E-SSA demodulator iterations. The initial condition is that σ(i,0)=0 ∀i corresponding to PLR=1 before starting the iterative demodulation cycle. In practice, at iteration step n one can first work out the value of $\rho_i(n)$ using the previous iteration σ(i,n−1) probabilities for i=2, ... K. At this point σ(1,n) can be computed using the value of $\rho_1(n)$. Then $\rho_2(n)$ is derived using the previous iteration σ(i,n−1) probabilities for i=3, ... K and σ(1,n). This process is repeated within the iteration n until $\rho_K(n)$ is derived. At this point the same recursive calculation will be repeated for the iteration step n until the maximum number of iterations is reached $N_{iter}^{max}$. This approach is more accurate than the one described in the section A but has the disadvantage to require a recursive solution. This enhanced analytical modelling allows to emulate the E-SSA detector evolution for a given packet power distribution assuming that the memory sliding window is long enough to avoid the impact of the memory border effects.

Having now at hand the enhanced E-SSA I-SIC model, it is possible to analytically derive the E-SSA detector SNIR for all packets $\rho_j(N_{iter}^{max})$ for j=1, 2, ... K for an arbitrary power distribution. If the condition $$\rho_j(N_{iter}^{max}) \geq \left[\dfrac{E_s}{N_t}\right]_{FEC}$$

is verified, then we can consider that for the current K packet load the detection of all the packets has been possible with a PLR $$\leq \Phi\left(\left[\dfrac{E_s}{N_t}\right]_{FEC}\right).$$

This allows to evaluate the E-SSA reachable maximal capacity, the associated PLR and the required number of detector iterations for any arbitrary packet power distribution.

C. Overall Optimization

The E-SSA RA performance dependency on some key system parameters exploiting the semi-analytical methodology developed in section B will be later investigated.

Figure 18:
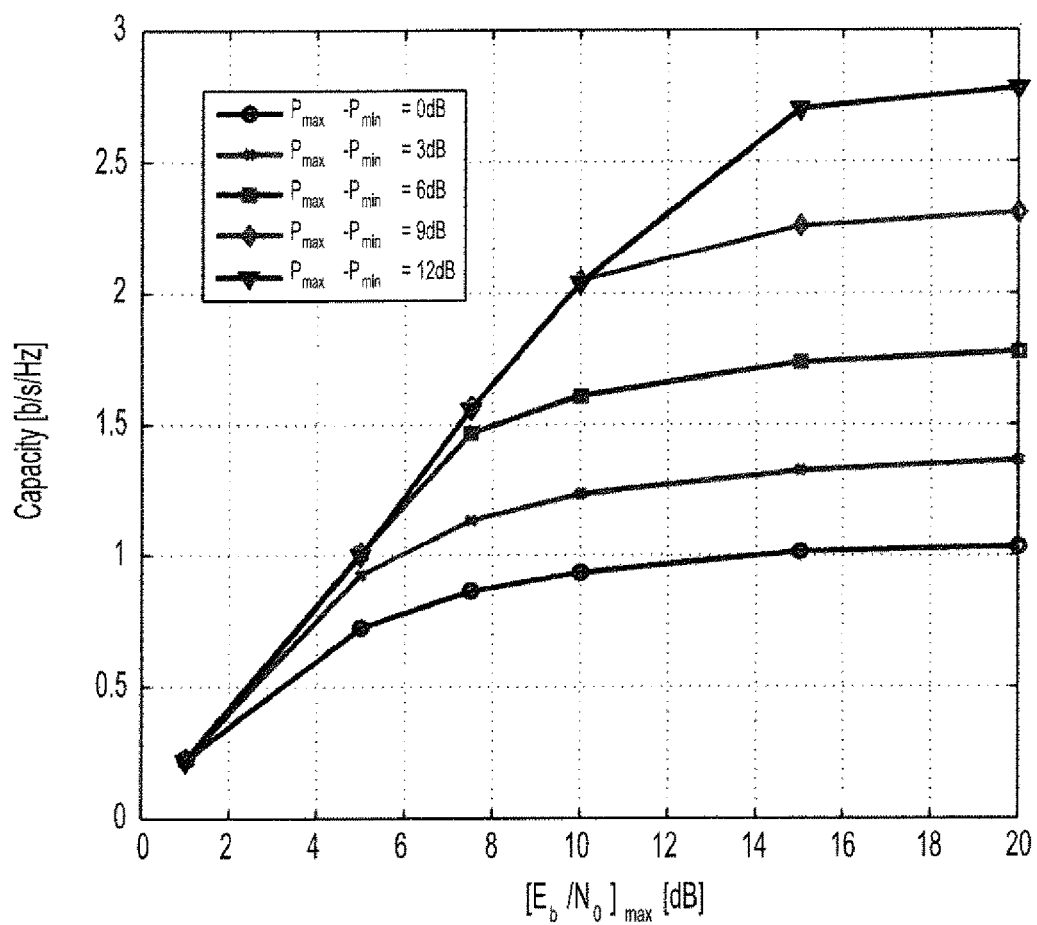
FIG. 18, plots of E-SSA throughput with optimized packet randomization range as a function of the $[E_b/N_0]_{max}$ for various values of $P_{max}-P_{min}$ with a BPSK modulation, 3 GPP FEC $r=\frac{1}{3}$, B=100 bits, $\beta=0.05$.

It can be showed that when extra link margin is available extra capacity may be achieved using an analytically optimized packet power distribution. It is therefore interesting to understand how the RA capacity is affected by the choice of the power randomization range. FIG. 18 illustrates the RA capacity dependency on the $[E_b/N_0]_{max}$ value when limiting the power dynamic range below the optimum one. This may due to terminal EIRP or to demodulator dynamic range limitations. The reduction in the packet power dynamic range generates an asymptote in the E-SSA throughput characteristic for increasing $[E_b/N_0]_{max}$ values. This is caused by the E-SSA demodulator I-SIC processing. More complex joint Multi User Detection (MUD) algorithms are expected to provide higher throughput in the presence of equi-powered packets at the expenses of greater demodulator complexity. It should be remarked that in the realistic case for a satellite network of $[E_b/N_0]_{max} \leq 10$ dB, an incoming packets power range of 9 dB is sufficient to get near-optimum throughput.

Figure 19A:
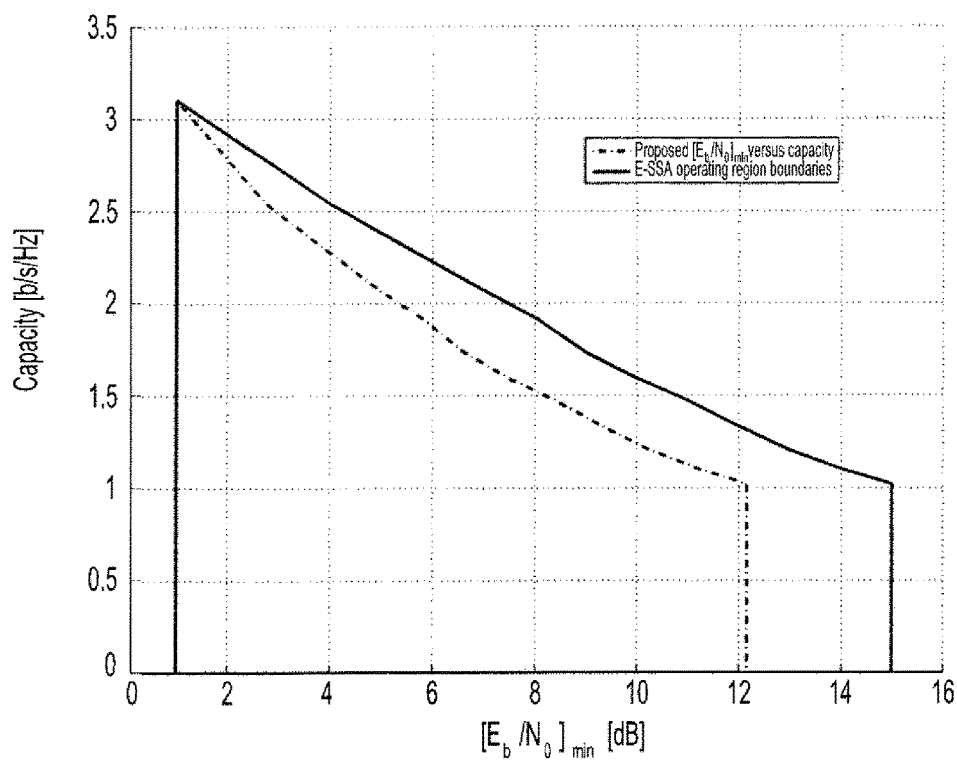
FIGS. 19A and 19B, plots of E-SSA throughput with optimized packet randomization range as a function of the $[E_b/N_0]_{min}$ for a value of $\beta=0$ and a value of $\beta=0.05$ with a BPSK modulation, 3 GPP FEC $r=\frac{1}{3}$, B=100 bits, $[E_b/N_0]_{max}=15$ dB.
Figure 19B:
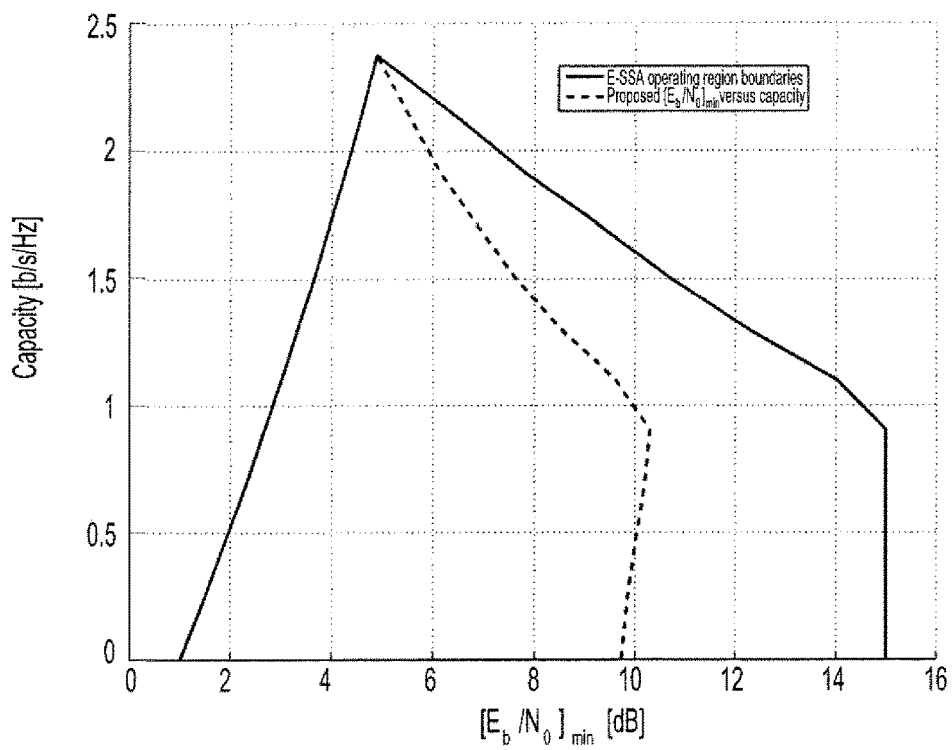

Now we investigate the RA throughput dependency on the $$\left[\frac{E_b}{N_0}\right]_{min}$$

value when the $$\left[\frac{E_b}{N_0}\right]_{max}$$

value is constrained by system design aspects. An example of such dependency is shown in FIGS. 19 A-B where $$\left[\frac{E_s}{N_0}\right]_{max} = 15 \text{ dB}$$

has been assumed. More precisely FIG. 19 A refers to the case of $\beta=0$. In this case the highest capacity is obtained for $$\left[\frac{E_b}{N_0}\right]_{min} = 1 \text{ dB}$$

which is also the FEC threshold for the target PLR of $10^{-3}$. Reducing the packets dynamic range by increasing the value of $$\left[\frac{E_b}{N_0}\right]_{min}$$

the RA capacity monotonically decreases. As shown in FIG. 19 B, when $\beta=0.05$ then the maximum RA capacity is obtained for $$\left[\frac{E_b}{N_0}\right]_{min} = 5 \text{ dB}$$

which is well above the FEC threshold. Thus differently from the $\beta=0$ case, there is not a monotonic RA throughput dependency on the $$\left[\frac{E_b}{N_0}\right]_{min}$$

value. The important conclusion of this analysis is that the region inside the capacity polygon versus $$\left[\frac{E_b}{N_0}\right]_{min}$$

shown in FIGS. 19 A-B ensures that the target PLR will be achieved. However, to ensure a stable system operation it is best to keep a certain distance from the polygon boundaries.

Thus for practical demodulators for which $\beta \neq 0$, assuming given by the system design the value of $$\left[\frac{E_s}{N_0}\right]_{max},$$

the $$\left[\frac{E_b}{N_0}\right]_{min}$$

value has to be adapted according to the current MAC load. A possible pragmatic approach for a given system operating capacity is to select $$\left[\frac{E_b}{N_0}\right]_{min}$$

as the numerical average between the values obtained crossing an horizontal line corresponding to the current system capacity with the FIG. 19 B $$\left[\frac{E_b}{N_0}\right]_{min}$$

curve (see dashed line in FIG. 19 B). This approach will guarantee the maximum robustness of the system operation against possible packet power level errors (e.g. due to link budget uncertainties) or due to average traffic level variation from the expected one.

D. Packet Power Control Algorithm

Figure 20:
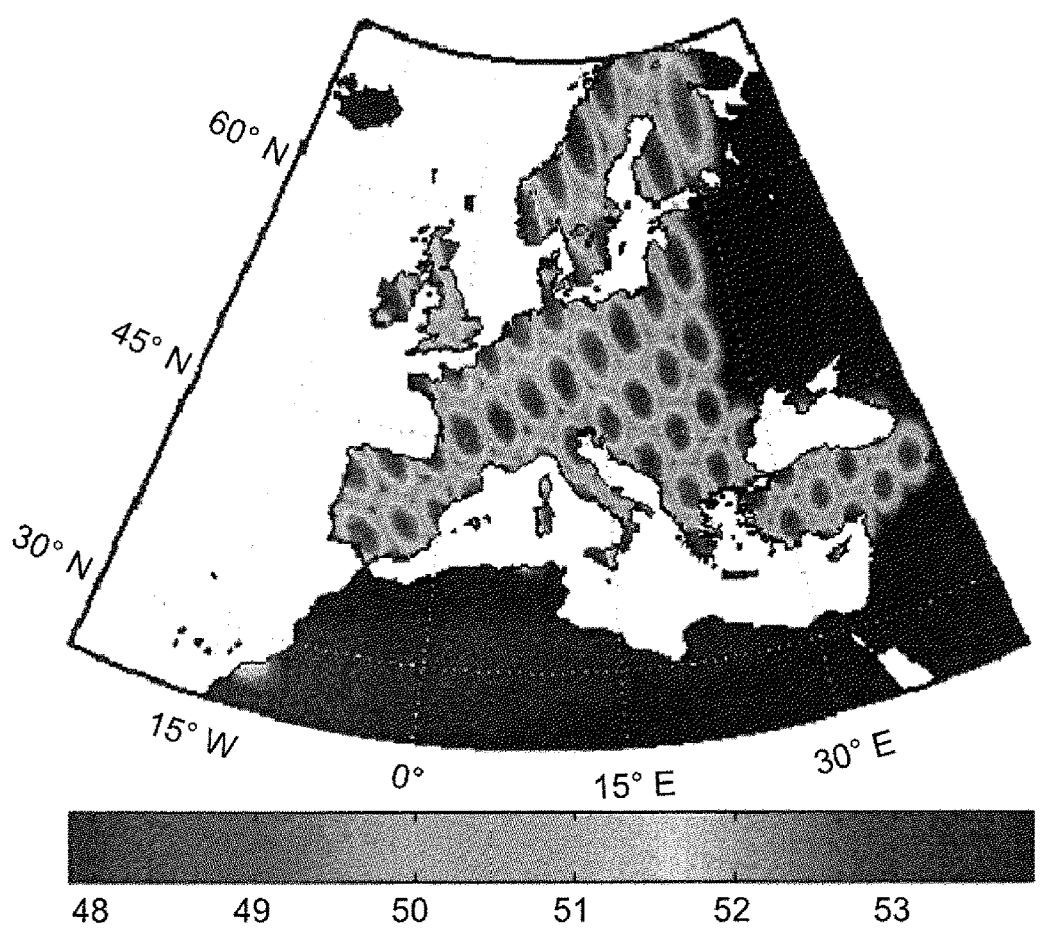
FIG. 20, a example of satellite receive multibeam antenna gain (dBi) chart over the European coverage.

We assume a fixed satellite RA network with a large population of terminals scattered across the coverage area. The proposed Uplink Packet Transmission Control (UPTC) has the following features: a) It is approximately achieving the optimum power distribution derived in Sect. 3 at the gateway demodulator input even in the presence of fading, non-uniform satellite antenna gain pattern and UT RF power limitations; b) It is based on open loop power control; c) It does not require information about the individual UT power settings; d) It can be easily extended to support different classes of services. A fixed satellite access system will face time and location dependent attenuation due to atmospheric fading and to the variability of satellite receive antenna gain and geometrical path loss. As the user link has to be sized for the worst case link attenuation (geometry dependent path loss, satellite antenna gain and atmospheric loss for the required link availability), it is of interest to exploit the intrinsic link margin to enhance the RA system throughput as discussed in-depth in the previous sections. The terminal EIRP shall be adapted to the required target value which takes into account the various system parameters such as the geometry dependent path loss, satellite antenna gain and atmospheric loss in addition to the E-SSA parameters including the optimum power randomization range. The latter will require some terminal EIRP "headroom" allowing to approximate the optimum power randomization distribution previously derived. The terminal EIRP headroom is a compromise among achievable packet bit rate, RA throughput and the maximum EIRP. The latter has typically a strong impact on the terminal cost and for this reason an upper limit named $[P_{EIRP}]_{max}$ is typically imposed. For this reason while designing the system it may happen that not all the terminals have enough available EIRP headroom to achieve the optimum theoretical power randomization range. In this case a subset of the terminal population will operate with a sub-optimum randomized power range. In the extreme case of negative link margins the transmission of packets is forbidden. The terminal power control is operating in open loop thus not causing any unwanted signalling overhead. The system designer should adapt the system parameters (e.g. the bit rate) to ensure that the percentage of terminals having a reduced power randomization range is small enough to cause no impact to the overall system throughput. Analytically the proposed UPTC algorithm can be expressed as [24]:

$$P_{EIRP}(G, t, k) = \begin{cases} [P_{EIRP}]_{min}^{opt}(G, t, k) \cdot R(G, t, k) & \text{if } [P_{EIRP}]_{max} \geq [P_{EIRP}]_{max}^{opt}(G, t, k) \\ [P_{EIRP}]_{min}^{opt}(G, t, k) \cdot R^*(G, t, k) & \text{if } [P_{EIRP}]_{min}^{opt}(G, t, k) \leq [P_{EIRP}]_{max} < [P_{EIRP}]_{max}^{opt}(G, t, k) \\ 0 & \text{if } [P_{EIRP}]^{max} < [P_{EIRP}]_{min}^{opt}(G, t, k) \end{cases} \quad (25)$$

with: $[P_{EIRP}]_{min,max}^{opt}(G, t, k) = \frac{K_B}{R_b} \left[\frac{E_b}{N_0}\right]_{min,max}^{opt}(G) \frac{L_{up}(t, k)}{\left[\frac{G}{T}\right]_{SAT}(k)}$ with $K_B$ is the Boltzmann constant, $R_b$ is the terminal bit rate, $\left[\frac{E_b}{N_0}\right]_{min}^{opt}(G), \left[\frac{E_b}{N_0}\right]_{max}^{opt}(G)$ are the optimum minimum E-SSA demodulator operating $E_b/N_0$ derived as described in Sect. 5.1 and $L_{up}(t,k)$ is the current uplink attenuation for terminal k at time t estimated from the downlink received power and $[G/T]_{SAT}(k)$ is the satellite receive antenna GIT towards terminal k. The system parameters $\left[\frac{E_b}{N_0}\right]_{min}^{opt}(G), \left[\frac{E_b}{N_0}\right]_{max}^{opt}(G),$ $R_b$ and $[G/T]_{SAT}(k)$ are known to the terminals (either stored or broadcasted in the forward link). Finally, the rv R(G,t,k) is uniformly distributed in dB in the range $\left[0, 10\log_{10}\left\{\frac{[P_{EIRP}]_{max}^{opt}(G, t, k)}{[P_{EIRP}]_{min}^{opt}(G, t, k)}\right\}\right]$ and the rv R*(G,t,k) is uniformly distributed in dB in the range $\left[0, 10\log_{10}\left\{\frac{[P_{EIRP}]_{max}}{[P_{EIRP}]_{min}^{opt}(G, t, k)}\right\}\right].$ To assess the practical advantages of packet power distribution optimization a Ka-band geostationary multibeam satellite study case has been investigated. The satellite has an European coverage obtained through 80 beams with the antenna gain shown in FIG. 20. The system parameters have been listed in the Table 7.

TABLE 7

Multi-beam Ka-band system study case parameters.

| | Symbol | Unit | Value |
|---|---|---|---|
| Physical layer parameters | | | |
| Bit rate | $R_b$ | kbps | 80 |
| FEC coding rate | r | — | 1/3 |
| Symbol rate | $R_s$ | kbaud | 240 |
| Spreading factor | $L_w$ | — | 16 |
| Chip rate | $R_c$ | Mcps | 3.84 |
| Roll-off factor | | — | 0.22 |
| Pilot/data power ratio | | dB | −10 |
| Signal bandwidth | | MHz | 4.68 |
| Terminal parameters | | | |
| Tx frequency | | GHz | 29.75 |
| Tx saturated power | | W | 0.1 |
| Antenna diameter | | m | 0.75 |
| Antenna gain | | dBi | 43 |
| Terminal max EIRP | | dBW | 33.0 |
| Pointing losses | | dB | 1.39 |
| Effective EIRP | | dBW | 31.6 |

Figure 21:
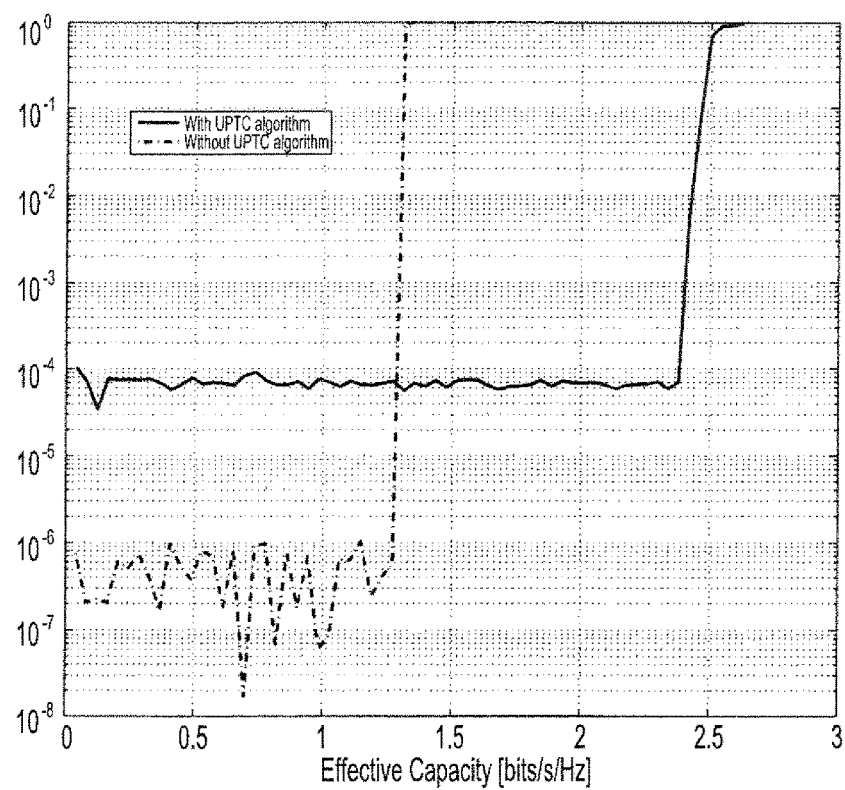
FIG. 21, plots of E-SSA analytical dependency on the average MAC load with and without the Uplink Packet Transmission Control (UPTC) algorithm.
Figure 22:
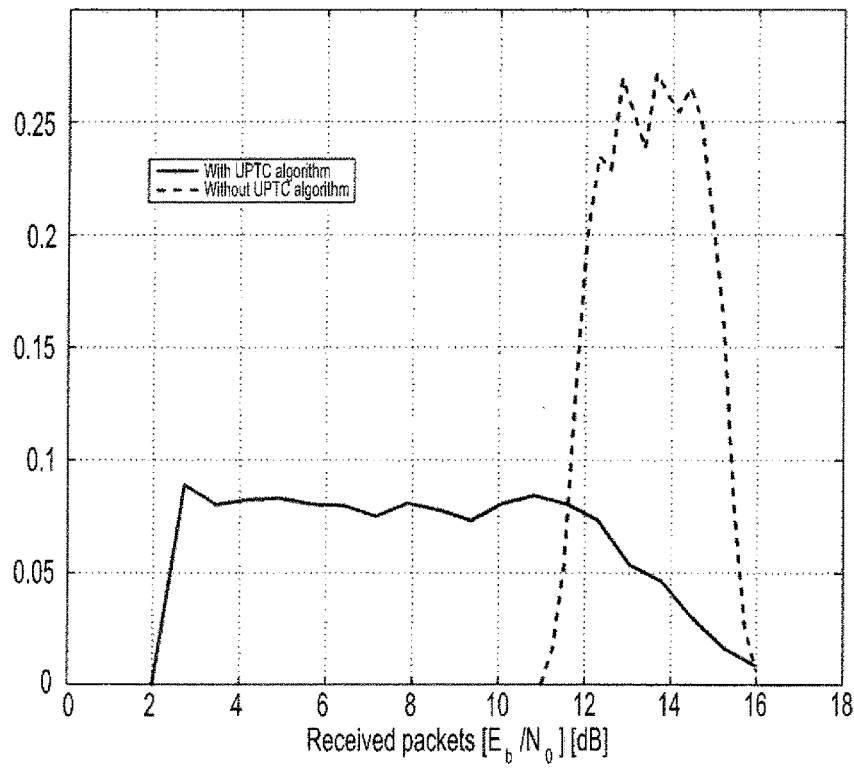
FIG. 22, plots of E-SSA incoming demodulator packets power distribution with and without the UPTC active.

The corresponding PLR dependency on the MAC average load when using no power control and optimized power control according to the UPTC algorithm described by eqn. (25) is shown in FIG. 21. The advantage of the UPTC algorithm optimizing the packet power distribution is evident as it brings a remarkable 85% throughput improvement. To be noted that this improvement takes into account that without UPTC there is already a 4 dB power randomization due to the difference in antenna gain and path loss for the different coverage locations on ground. As shown in FIG. 22 the UPTC is further expanding the power randomization range and making it closer to the optimum distribution.

The invention claimed is:
1. A method of transmitting data packets from a terminal (T) to a gateway receiver (GWR) over a channel shared with other terminals using an unslotted spread spectrum random access protocol,
   wherein successive interference cancellation of the data packets received by the gateway receiver is performed by said gateway receiver, and
   wherein said transmitting is performed at a transmit power level given by the sum of a deterministic term, function of a communication link budget, and of a random term, following a predetermined probability distribution chosen such that, when used by all the terminals sharing the channel, it maximizes the channel throughput subject to at least transmit power level constraints, said predetermined probability distribution being a uniform distribution in decibels, comprised between a minimum value $\alpha_{min}$ larger than the minimum required signal-to-noise ratio and a maximum value $\alpha_{max}$ smaller than the maximum required signal-to-noise ratio, both said terms being expressed in decibels.
2. The method according to claim 1, further comprising a step of receiving a value for at least one parameter chosen from a list comprising: a noise level at the input of said gateway receiver, a satellite user downlink Effective Isotropic Radiated Power, a target packet carrier-to-noise power ratio and a service profile, said value or values being broadcast by a central station, and of using said received value for computing said predetermined probability distribution.

3. The method according to claim 1, wherein said predetermined probability distribution is chosen such that, when used by all the terminals sharing the channel, it minimizes the difference in signal to noise plus interference ratio (SNIR) between data packets within successive interference cancellation.

4. The method according to claim 1, wherein said successive interference cancellation is an iterative successive interference cancellation.

5. The method according to claim 1, further comprising a step of blocking transmission when an attenuation level of the communication link between the terminal and the gateway receiver exceeds a predetermined threshold.

6. The method according to claim 1, further comprising a step of computing said deterministic term of the transmit power level, said step including estimating an attenuation level of the communication link between the terminal and the gateway receiver from signals transmitted by said gateway receiver and received by said terminal.

7. The method according to claim 6, wherein said step of computing said deterministic term of the transmit power level includes receiving the value of at least one parameter of said communication link budget, other than said attenuation level, broadcast by a central station.

8. A method of operating a communication system comprising:
    using a plurality of terminals ($T_1 \ldots T_N$) for transmitting data packets to a gateway receiver (GWR) over a shared channel using an unslotted spread spectrum random access protocol; and
    using said gateway receiver to receive said data packets and perform successive interference cancellation of the data packets received by the gateway receiver;
    wherein each said terminal transmits said data packets using the method according to claim 1.

9. The method according to claim 8, comprising no synchronization or coordination between said terminals.

10. The method according to claim 8, wherein said successive interference cancellation is an iterative successive interference cancellation.

11. A terminal (T) comprising an emitter (TE) for transmitting data packets from said terminal to a gateway receiver (GWR) communicating over a communication channel shared with other terminals ($T_1 \ldots T_N$) using an unslotted spread spectrum random access protocol and a processor (TPR) for determining a transmit power level, said emitter being configured to transmit to data packets at a transmit power level given by the sum of a deterministic term, function of a communication link budget, and of a random term, following a predetermined probability distribution, said predetermined probability distribution being chosen such that, when used by said other terminals sharing the communication channel, it maximizes the channel throughput subject to at least transmit power level constraints, the said predetermined probability distribution being a uniform distribution in decibels, comprised between a minimum value $\alpha_{min}$ larger than the minimum required signal-to-noise ratio and a maximum value $\alpha_{max}$ smaller than the maximum required signal-to-noise ratio, both said terms being expressed in decibels.

12. A communication system comprising:
    a plurality of terminals ($T_1 \ldots T_N$) each of which comprises an emitter (TE) for transmitting data packets from the terminal to a gateway receiver (GWR) communicating over a communication channel shared with other terminals ($T_1 \ldots T_N$) using an unslotted spread spectrum random access protocol and a processor (TPR) for determining a transmit power level, said emitter being configured to transmit to data packets at a transmit power level given by the sum of a deterministic term, function of a communication link budget, and of a random term, following a predetermined probability distribution, said predetermined probability distribution being chosen such that, when used by said other terminals sharing the communication channel, it maximizes the channel throughput subject to at least transmit power level constraints, the said predetermined probability distribution being a uniform distribution in decibels, comprised between a minimum value $\alpha_{min}$ larger than the minimum required signal-to-noise ratio and a maximum value $\alpha_{max}$ smaller than the maximum required signal-to-noise ratio, both said terms being expressed in decibels; and
    the gateway receiver (GWR) communicating over a shared communication channel, the gateway receiver comprising a detector (GWD) for receiving and detecting data packets transmitted by said terminals over said shared communication channel using successive interference cancellation.

13. The communication system according to claim 12, wherein said gateway receiver performs iterative successive interference cancellation.

\* \* \* \* \*